(12) United States Patent
De Monseignat et al.

(10) Patent No.: US 8,578,166 B2
(45) Date of Patent: Nov. 5, 2013

(54) SYSTEM AND METHOD FOR AUTHENTICATION, DATA TRANSFER, AND PROTECTION AGAINST PHISHING

(75) Inventors: Bernard De Monseignat, Monte Carlo (MC); Stéphane Moreau, Beauchamp (FR)

(73) Assignee: Morgamon SA, Luxembourg (LU)

( * ) Notice: Subject to any disclaimer, the term of this patent is extended or adjusted under 35 U.S.C. 154(b) by 933 days.

(21) Appl. No.: 12/187,224

(22) Filed: Aug. 6, 2008

(65) Prior Publication Data

US 2009/0077383 A1 Mar. 19, 2009

Related U.S. Application Data

(60) Provisional application No. 60/954,259, filed on Aug. 6, 2007, provisional application No. 60/973,590, filed on Sep. 19, 2007.

(51) Int. Cl.
*H04L 9/28* (2006.01)
*H04L 9/00* (2006.01)
*H04L 9/08* (2006.01)

(52) U.S. Cl.
USPC ....... 713/175; 726/3; 726/5; 726/26; 713/176

(58) Field of Classification Search
USPC ............. 713/715, 175, 156, 176; 726/3, 5, 26
See application file for complete search history.

(56) References Cited

U.S. PATENT DOCUMENTS

| 5,428,349 A | 6/1995 | Baker |
| 6,006,328 A | 12/1999 | Drake |
| 6,246,769 B1 | 6/2001 | Kohut |
| 6,668,325 B1 | 12/2003 | Collberg et al. |
| 7,124,445 B2 | 10/2006 | Cronce et al. |
| 7,210,134 B1 | 4/2007 | Langer |
| 7,395,428 B2 * | 7/2008 | Williams et al. ............. 713/170 |

(Continued)

FOREIGN PATENT DOCUMENTS

| GB | 2434662 A | 8/2007 |
| JP | 2004213117 | 7/2004 |

(Continued)

OTHER PUBLICATIONS cPanel, Community Forums—redirecting, 2004, Retrieved from the Internet <URL: forums.cpanel.net/f34/redirecting-https-domain-2083-https-host-2083-a-26648.html>, pp. 1-3 as printed.*

(Continued)

*Primary Examiner* — Saleh Najjar
*Assistant Examiner* — Shu Chun Gao
(74) *Attorney, Agent, or Firm* — Venable LLP

(57) ABSTRACT

Methods and systems for secure electronic data communication over public communication networks. A secure data communication component may be utilized to implement a communication protocol. New versions of the data communication component may be generated, with each version containing a different communication protocol. Source code of the data communication component may be modified using a polymorph engine to create a functionally-equivalent component having a different code structure. An anti-phishing component may intercept a link in an electronic communication activated by a user, analyze the link and the electronic communication, determine a phishing risk to the user posed by the link, and direct the user to a location indicated by the link or redirect the user to a valid location. A server authentication component may detect and prevent DNS attacks, injections, and defacing activities.

9 Claims, 16 Drawing Sheets

(56) References Cited

U.S. PATENT DOCUMENTS

| | | | |
|---|---|---|---|
| 7,725,930 B2* | 5/2010 | Lawrence et al. | 726/10 |
| 7,757,088 B2* | 7/2010 | Abdulhayoglu | 713/175 |
| 2002/0124172 A1* | 9/2002 | Manahan | 713/176 |
| 2004/0030784 A1 | 2/2004 | Abdulhayoglu | |
| 2004/0268322 A1 | 12/2004 | Chow et al. | |
| 2006/0020559 A1 | 1/2006 | Steinmetz | |
| 2006/0048223 A1 | 3/2006 | Lee et al. | |
| 2006/0066913 A1 | 3/2006 | Nakashima | |
| 2006/0069913 A1 | 3/2006 | Valente | |
| 2006/0075260 A1 | 4/2006 | Tucker et al. | |
| 2006/0101120 A1 | 5/2006 | Helsper et al. | |
| 2006/0123464 A1 | 6/2006 | Goodman et al. | |
| 2006/0218403 A1* | 9/2006 | Sauve et al. | 713/175 |
| 2006/0253687 A1 | 11/2006 | Jakubowski et al. | |
| 2007/0039048 A1 | 2/2007 | Shelest et al. | |
| 2007/0135111 A1 | 6/2007 | Floyd | |
| 2007/0156900 A1 | 7/2007 | Chien | |
| 2007/0226784 A1 | 9/2007 | Ueda et al. | |
| 2007/0234063 A1 | 10/2007 | Ueda et al. | |
| 2007/0250916 A1* | 10/2007 | Shull et al. | 726/5 |
| 2009/0292925 A1* | 11/2009 | Meisel | 713/176 |
| 2010/0211773 A1* | 8/2010 | Lawrence et al. | 713/156 |

FOREIGN PATENT DOCUMENTS

| | | |
|---|---|---|
| JP | 2005-524910 A | 8/2005 |
| JP | 2006-520112 A | 8/2006 |
| WO | WO 96/42075 | 12/1996 |
| WO | WO-03/096238 A1 | 11/2003 |
| WO | WO-2004/049137 A2 | 6/2004 |

OTHER PUBLICATIONS

International Search Report and Written Opinion for PCT/US2008/72381 mailed on Nov. 5, 2008.
Gunter Ollman, "The Pharming Guide," Jul. 2005, http://www.ngssoftware.com.
International Preliminary Report on Patentability issued from the International Searching Authority in Application No. PCT/US2008/072381 dated Feb. 9, 2010.
Office Action issued from the Intellectual Property Office of Australia in Application No. 2008283847 dated Sep. 21, 2012.
Office Action issued from the Intellectual Property Office of the Philippines Bureau of Patents in Application No. PH 2010/500324 dated Apr. 18, 2013.
Office Action issued from the Israeli Patent Office in Application No. 203763 dated Mar. 19, 2013.
Office Action issued from the New Zealand Intellectual Property Office in Application No. NZ 583300 dated Aug. 30, 2012.
Office Action issued from the New Zealand Intellectual Property Office in Application No. NZ 583300 dated Jul. 7, 2011.
Office Action issued from the Mexican Patent Office in Application No. MX/a/2010/001549 dated Jun. 26, 2012.
Office Action issued from the Russian Patent Office in Application No. RU 2010107990 dated Sep. 27, 2012 , Translation only.
Office Action issued from the Japanese Patent Office in Application No. 2010-520291 dated Feb. 27, 2013.
Office Action issued by the State Intellectual Property Office (SIPO) for Chinese Patent Application No. 200880110153.4 on Jan. 4, 2012.
Office Action from Russian Patent Application No. 2010107990, dated Aug. 26, 2013.

* cited by examiner

SYSTEM AND METHOD FOR AUTHENTICATION, DATA TRANSFER, AND PROTECTION AGAINST PHISHING

CROSS-REFERENCE TO RELATED APPLICATIONS

This application claims priority to U.S. provisional patent application No. 60/954,259, entitled "System and Methods for Online Authentication and Data Transfer Protection," filed Aug. 6, 2007; and U.S. provisional patent application No. 60/973,590, entitled "System and Methods for Protection of Online Data Transfer and Anti-phishing Authentication," filed Sep. 19, 2007, the disclosures of which are incorporated by reference herein.

BACKGROUND OF THE INVENTION

Online identity theft, financial information theft, phishing, viruses, spyware, and other data communication-related malicious activities cost businesses, individuals, academic institutions, and governments billions of dollars each year. Further, such activities are also responsible for significant lost productivity, nuisance, and may inhibit use of online communication. Such activities plague not only users of commercial servers, but are also a major concern for users of other networks and systems including government computer systems, banking computer systems and online banking platforms, academic computer systems, and online retail platforms.

Various methods and systems have been proposed for user identification, authentication, and prevention of attacks and phishing schemes in the context of network data communication. These known techniques are typically based on a small number of simple mechanisms that have proven to be inadequate against sophisticated malicious and/or criminal activities. Further, these known techniques are incapable of adapting to advancements in the technology and skill of malicious entities, who have demonstrated an ability to rapidly adjust their techniques and methods.

Accordingly, a need exists for robust and adaptive systems and methods for detecting many forms of data-communication, phishing, and security-related threats, and for reacting to such detection by deactivating the detected threats and/or correcting their effects.

BRIEF SUMMARY OF THE INVENTION

An aspect of the present application may provide for a method for data communication using a computer device, comprising determining whether to upgrade a first version of a data communication component, the first version of the data communication component containing a definition of a first communication protocol, connecting to a secure server when it is determined to upgrade the first version of the data communication component, performing an authentication check, receiving a package from the secure server when the authentication check is successful, the package containing at least a second version of the data communication component containing a definition of a second communication protocol, determining whether a digital signature embedded in package is valid, installing the second version of the data communication component when the digital signature is valid, executing the second version of the data communication component, and performing data communication utilizing the second version of the data communication component and the second communication protocol. In the method, determining whether to upgrade a first version of a data communication component may include determining a time elapsed from a time of a prior execution of the first version of the data communication component to a present time, comparing the elapsed time with a predetermined trigger time value, and connecting to the secure server when the elapsed time is one of equal to or greater than the triggering time value. The comparing the elapsed time may include determination of the present time using a network time protocol. The method may include generating an alert when the authentication check is not successful or the digital signature is not valid and transmitting the alert to at least one of a user of the computer device, a user of the secure server, or a survey server. An address of the secure server may be located in a pool of direct IP addresses and the pool of direct IP addresses is stored in the first version of the secure communication component. The authentication check may include use of at least one of a zero knowledge protocol, an SSL certificate, or an asymmetric cryptography technique. The package further includes at least one dependency of the second version of the data communication component. The second version of the data communication component may include a modification of source code of the first version of the data communication component and the modification is produced by a source code level polymorph engine. The source code level polymorph engine performs at least one of insertion of noise using non-functional instructions, embedding of variables, embedding of mathematical functions, embedding of values, insertion of jumps, insertion of time-shifting delays, randomly reordering the source code, insertion of references to API and call wrappings, insertion of tracer detection code, insertion of sub-thread generators, insertion of fake code, or insertion of auto-protection systems.

A further aspect of the present application may provide for a method for generating a second version of a data communication component using a computer device, comprising generating a pool of random numbers, generating a pool of ciphering keys, modifying source code of a first version of a data communication component using the pool of random numbers, linking a library of equivalent functions, compiling the modified source code, shielding the compiled source code, signing of the shielded compiled source code, and embedding dependencies. The second version of the data communication component may include a modification of source code of the first version of the data communication component, and the modification may be produced by a source code level polymorph engine. The source code level polymorph engine may perform at least one of insertion of noise using non-functional instructions, embedding of variables, embedding of mathematical functions, embedding of values, insertion of jumps, insertion of time-shifting delays, randomly reordering the source code, insertion of references to API and call wrappings, insertion of tracer detection code, insertion of sub-thread generators, insertion of fake code, or insertion of auto-protection systems. The shielding may be performed by a binary level code protector, and the binary level code protector may include a binary level polymorph engine. The binary level polymorph engine may perform at least one of injection of code protection functions, injection of anti-tracers, injection of anti-debugger traps, compression of binary code, ciphering of binary code, rewriting of headers, rewriting of resources, or rewriting of loaders. The signing of the compiled source code may include signing with an editor's private key. The dependencies may include at least one of an anti-malware database, a correction, or updated elements of other processes.

A further aspect of the present application may provide for a method for data communication using a computer device, comprising intercepting data communication when a link embedded in an electronic communication is selected by a user, the link containing at least one target location identifier, determining a type of application used to display the electronic communication, and when the application type is one of an electronic communication reader application or a web browser software application in a web-mail domain, extracting the subject of the electronic communication, extracting the content of the electronic communication, analyzing the electronic communication, analyzing the extracted subject and content, analyzing the selected link, analyzing a human factor of the electronic communication, determining a risk factor based on the analysis of the electronic communication, the analysis of the extracted subject and content, the analysis of the selected link, and the analysis of the human factor, directing the user to one of the target location identified by the link or a valid location based upon a value of the determined risk factor. The extraction of at least one of the subject or the content of the electronic communication may include analyzing a document object model. Analyzing the communication may include at least one of determining whether the selected link is embedded in an electronic email document, detection of a location and size of at least one image in the electronic communication, detection of visible and invisible elements of the electronic communication, calculation of a distances between foreground and background colors of one of text, area, and zones of the electronic communication, or analysis of images contained in the electronic communication using an embedded picture recognition algorithm. Analyzing the subject and content may include at least one of analyzing words contained in the electronic communication, determination of a quantity of words commonly used in phishing communications, analyzing text referencing links contained in the electronic communication, or analyzing a format of the electronic communication. Analyzing the selected link may include at least one of detection of encoded links, detection of redirection of domains, detection of top level domains, detection of spoofed links, detection of sub-redirected links, sorting of improperly formatted links, detection of username spoofing, detection of direct IP links, detection of protected targets, detection of misspelled links, detection of phonetic meanings in textual links, detection of companions' links, detection of known domains, detection of free hosting services, detection of dangerous geographical regions, or checking hidden redirection by a local host file. The method may include analyzing the target location identified in the link. The direction of the user to the valid location may include obtaining a default valid location link from a protection field dictionary.

A further aspect of the present application may provide for a method for creation of a certificate using a computer device, comprising receiving a request for certification at a server, performing an external verification, generating the certificate, the generation utilizing at least one requested option, and signing the certificate using a private key, wherein the server is identified by a fully qualified domain name of the server and a TCP/IP address of the server.

A further aspect of the present application may provide for a method for using a certificate utilizing a computer device, comprising, querying a server hosting at least one website, launching a call to an internal function to determine a protection of the server, downloading the certificate, using a public key to verify an authenticity of the certificate, extracting at least one certificate field when the certificate is verified as authentic, calculating at least one of a digital signature or a hash code of data received from the server, comparing the at least one certificate field with at least one of the digital signature or the hash code of the received data, and determining whether the website is valid based upon a result of the comparison.

BRIEF DESCRIPTION OF THE SEVERAL VIEWS OF THE DRAWINGS

Embodiments of the present invention are illustrated by way of example in the accompanying figures, in which like reference numbers indicate similar elements, and in which.

DETAILED DESCRIPTION OF THE INVENTION

Figure 1:
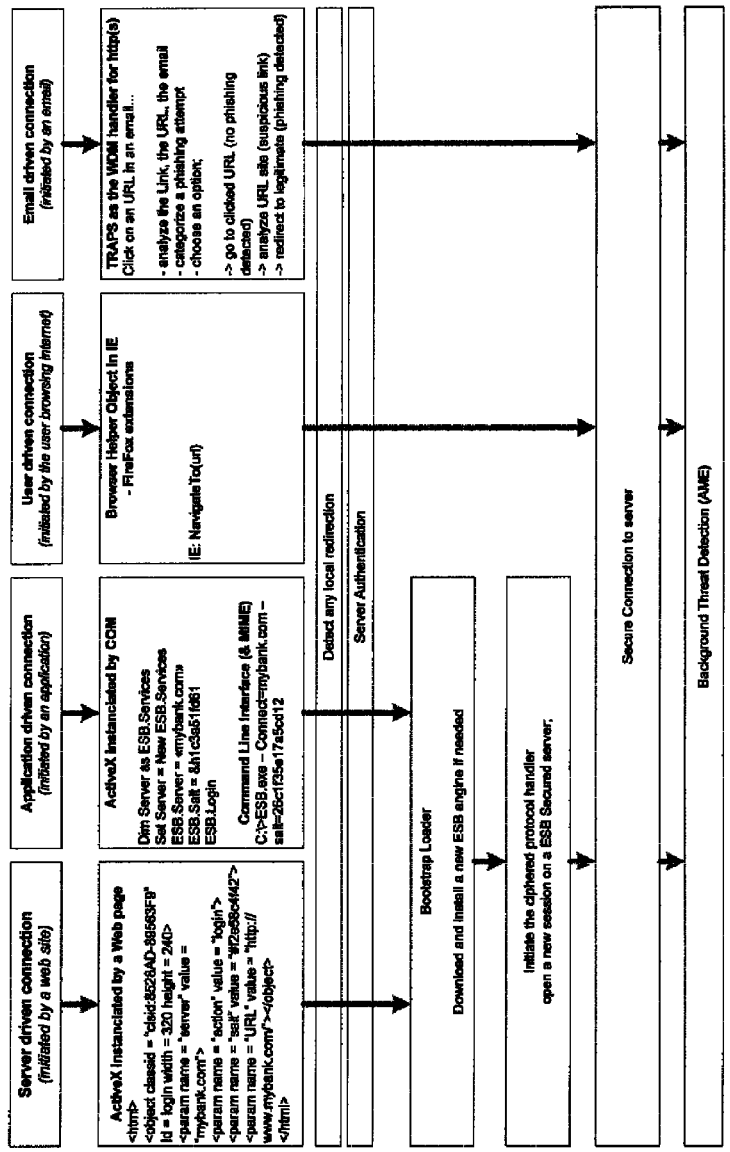
FIG. 1 shows interfaces and components of a secure communication component according to an exemplary embodiment.

Online identity theft, fraud, viruses, spyware, and other computer-related crimes cost businesses and individuals billions of dollars each year in financial and resource losses. The methods and systems of the present application may relate to detecting and preventing threats, hacks, phishing attempts, unauthorized access to computer devices, and attempts to obtain user identification, financial, and other sensitive information. Phishing attempts may be detected using a proactive method which allows dynamically blocking o-Days attacks and eliminates pharming. Other attacks which may be detected and prevented include local threats such as re-routing, spoofing, and the like; as well as malware-related threats such as worms, viruses, Trojans, key loggers, screen-scrapers, rootkits and other client-side threats. Additionally, server attacks including domain name system ("DNS") attacks, injections, defacing, and usurpations may also be detected and prevented through use of a server authentication and generic protection scheme.

As used in the present application, "phishing" may refer to a process of attempting to acquire sensitive information of users such as usernames, passwords, identification information, credit card information, financial account information, and the like, by masquerading as a trustworthy entity in an electronic communication. Communications purporting to be from known entities, such as banks or retailers may be used to lure unsuspecting users to provide such information, whereupon it may be used by malicious entities for illicit purposes such as theft, fraud, and the like. Phishing activities may commonly be performed via electronic mail, instant messaging, and/or similar software applications, and may direct users to enter the sensitive information at a website and/or other location that is designed to mimic a website or other location of the trusted entity, whereby the entered information may be transmitted to the malicious entity to be used in illicit activities.

Throughout the present application, the term "server" will be used to refer to a any computer device that is able to communicate with other computer devices via a data communication network and that is operable for sending information to a user, typically upon request. "Server" is intended to encompass both a single computer device and a collection of individual computer devices networked or otherwise able to communication with one another and acting in concert to provide information to users. Further, "server" is intended to encompass both the hardware of the computer device and any software run by or stored by the computer device, including for instance, web server applications, database applications, retailing applications, financial applications, and any other suitable software applications running on or obtained by the server. Accordingly, as used in the present application, the term "server" is intended to apply to both a computer device and to a website running on the computer device and including data provided by a web server application running on the computer device. Such a website may take any suitable form, such as an online store, a banking or other financial portal, an academic information portal, a social networking forum, an information distribution portal, and the like. Further, a server may include personal computer devices, portable computer devices, mainframe computer devices, handheld computer devices, personal digital assistant devices, smart phone devices, and any other suitable computer device that is capable of running software applications and communicating with other computer devices via a data communication line.

The present systems and methods may include software programs and/or routines stored in and executed by, for example, computer devices, and the software programs and/or routines may include software programs and/or routines for performing communication with other computer systems in conjunction with computer communication hardware and software. Communication between computer systems may be performed via a public communication network, for example the Internet, or via a private communication network separate from and independent of a public communication network. The communication may be performed by utilizing communication methods and protocols including TCP/IP, FTP, SSH, WIFI, and the like. The terms "computer system" and "network" as used herein may include a variety of combinations of fixed and/or portable computer hardware, software, peripherals, and storage devices.

The computer systems may each include a plurality of individual components that are networked or otherwise linked to perform collaboratively, or may include a stand-alone component. The computer systems may each further include at least one processing system, at least one internal storage device, at least one external storage device, at least one printing device, a reading device, and an input/output device. The storage devices may include devices for storing data electronically, such as hard drive devices, storages servers, storage-area networks, RAID configurations, optical media drives, holographic media drives, tape media drives, flash memory devices, and the like.

The computer systems may also include computer system components including one or more random-access memory modules, and input/output devices including one or more peripheral devices such as keyboards, mice, and monitors for enabling input and output of information to and from the computer systems. The software routines and/or programs may be embedded and/or stored in the internal storage device or external storage device and may be run by the respective processing systems. The processing systems may run software applications including operating systems such as UNIX, Linux, BSD, OS/2, VMS, and Microsoft applications, as well as database applications, web server applications, file server applications, mail server application, and the like.

Additionally, the computer systems may each be capable of network communication, and the network may include wired or wireless communication lines and associated hardware devices used in transmitting, receiving, and routing data, such as routers, switches, hubs, network interfaces, and the like.

The hardware and software components of the computer systems may include and may be included within fixed and portable devices including desktop, laptop, server, personal digital assistant, tablet, smart phone, television, radio, and audio and video recording devices.

The various functions of the systems and methods of the present application may be implemented via one or more components, and the one or more components may be utilized in conjunction with one another or independently, as described in detail below. As will be understood by one skilled in the art, the various components may be assembled, installed, and/or located collectively, or may be distributed amongst a plurality of independent locations and/or devices.

The various components of the systems and methods of the present application may include, but are not limited to, a secure communication layer component, an anti-phishing component, a server authentication component utilizing one or more certificates, and an anti-malware component. Each of the components may operate independently or in conjunction with one or more other components. Each of the components may be stored, installed in, and/or run by computer devices, as described in detail below.

The secure communication component may define a secure communication channel between an end-user computer device and/or application and a computer device, such as a server. The server may host and/or run, for example, a website and related software applications, and the website may provide commercial, financial, academic, government, and other like services. The component may embed an authentication system for computer device and user identification and authentication, and the authentication system may be based on personal certificates, hardware authentication, an internal virtual password system, an open API to hardware tokens, smartcards and other strong authentication systems, and the like.

The secure communication component may set a communication protocol between a user computer device and a secure server using one or more of a ciphered network protocol, a key agreement protocol, random keys and/or seeds, and a protocol syntax and grammar encoder which may be randomly chosen between generations. Further, the secure communication component may utilize multiple protection mechanisms, and may be reconfigured and/or modified in various versions or generations to inhibit reverse-engineering and analysis.

The secure communication component may include a bootstrap loader component. The bootstrap loader component may be operable to synchronize the secure communication component between one or more secured servers and a user, for example by automatically updating the secure communication module and its dependencies when required and/or at various time intervals.

Various server computer devices may be implemented in the systems and methods of the present application. The secure sever may include a computer device which may publicly expose components and information needed to update and be synchronized, and the secure server may be designated by a pool of IP addresses to bypass DNS resolution. The survey server may include a computer device associated with a dedicated pool of servers which may receive attack alerts and information from one or more of the components to track, analyze, and monitor attacks in real-time, as well as new generic attacks, such as phishing, DNS attacks, malware, and the like. Additionally, the survey server may be designated by a pool of IP addresses to bypass DNS resolution. A sensible server may include a computer device including a protection system, offering security and protection to users.

The anti-phishing component may be utilized, for instance, upon activation of a link or other object embedded or included in a communication, such as an electronic mail message. The anti-phishing component may then analyze the content and context of the communication, analyze the target specified by the communication, link, or embedded object, determine whether the communication, link, or embedded object is valid, and reroute a user to a valid location upon determining that the communication, link, or embedded object is not valid.

The server authentication component may detect, for instance from a client side, attempts to spoof a computer device such as a web server or to alter content provided. Additionally, the server authentication component may detect forging, pharming, injecting, or defacing attacks as well as DNS attacks by making a generic form of certificate publicly available on the server side, and allowing the verification of all sensible characters by the usage of strong encryption. The server authentication system may rely on a strong encryption model certificate linking a valid IP address and a domain name of a server. The certificate may further embed other functionality operable to allow static or dynamic checking of the content of a server, its references, and the like. The certificate may be made available in the form of a file, a cookie, a MIME definition, a stream of data, a structured storage definition, and/or in any other suitable form. The server authentication component may be used by one or more other components, for example, each time connection to a sensible server is required. Upon completion of such a connection, full verification of the server's authentication, content, and/or perimeter is performed before returning the control to the caller. No modification of DNS architecture may be required, and the protection may be passive and on the client side. The server authentication component may be in the form, for example, of an executable code as an ActiveX server, a COM object, generic function, or a standard application offering a command line interface, allowing exporting its services to various interfaces, applications, and computer languages.

The anti-malware component may include an anti-virus scanner containing a database of a selection of known threats. The anti-malware component may detect threats by scanning items such as a registry, startup entries, paths, folders, opened ports, mutex, files, and behaviors. The anti-malware component may be operable to detect and identify known and generic threats and to detect attacks and to create an auto-defense system based on a knowledge base.

The redirection detection component may analyze items such as a local hosts file and local DNS settings each time a connection is attempted with a sensible server thereby detecting attempts to redirect the connection.

Secure Communication Component

The secure communication component may include a communication protocol engine, and may embed one or more sets of security elements including protocols, ciphering layers, keys, settings, languages, syntax, grammar, and the like. New versions, or "generations" of the secure communication component may created, and the secure communication component be modified and/or altered between successive versions at various time intervals, or upon manual activation, to embed different and unpredictable sets of security elements. Throughout the present application, the secure communication component may also be referred to as the "ESB Component."

The secure communication component may include a secure communication component loader. Referring to FIG. 1, the secure communication component loader may be implemented in one or more ways. In an exemplary embodiment, for instance, in a server-driven connection, the secure communication component loader may include a server object such as an ActiveX server object. The secure communication component loader may, for instance, be called from any standard HTML web page by including a reference to an object. In an exemplary embodiment, the object may include, for instance a "tag <OBJECT>." Alternatively, the secure communication component loader may be called from any "COM" compliant computer language, as a standard application from a command line scheduled by a scheduler application of an operating system, manually by a user and/or an administrator of a computer device of the user, by a computer language, as a MIME association, and the like. Alternatively, in a user-driven connection, the secure communication component loader may include a browser helper object, and/or a generic COM server as a standard application. As will be understood by one skilled in the art, other ways of implementation may be utilized, and the secure communication component loader may be implemented in any suitable form or mechanism.

The secure communication component may be implemented through a download and installation procedure to locate the component on a computer device of a user. The installation may include, for example, downloading of a downloadable object via a link located in an HTML webpage. In an exemplary embodiment, for instance, a download from an html page may be performed via a standard HTML tag, for instance, a tag in the form of "<object src=*.cab>", or any other suitable mechanism for presenting software components to a user via a webpage and/or location. The secure communication component may alternatively be provided to the user via delivery on physical media, or through an automated download and storage function of another software application running on a computer device of the user such as an anti-virus application, a downloader, a standard independent application, a driver, or an extension or plug-in of an application such as a web browser application. Alternatively, the secure communication component may be downloaded, installed, and implemented as a browser extension application operable with one or more web browser software applications.

An active component located on the computer device of the user may detect threats located on both the computer device of the user (the "client side") and the server that the user computer device may communicate with (the "server side").

The secure communication component may detect attempts of the user to connect to a fraudulent website in real time, for example, a farming and/or phishing website, by using a heuristic detector that detects and automatically modifies fraudulent links into legitimate links, preventing unwanted visits to potentially harmful websites or locations.

The secure communication component may embed multiple modules, and each such modules may function independently or in concert with one another. Further, the secure communication component may call, and may be called by, one or more other components, as described in detail below.

The secure communication component may define a secure communication channel between a user computer device and/or application running on a computer device of the user, and a server. The secure communication component may include an authentication system for computer device and user identification and authentication. The embedded authentication system may be based on personal certificates, hardware authentication, an internal virtual password system, an open API to hardware tokens, smartcards, and/or other strong authentication mechanisms.

The secure communication component may also set a communication protocol between a user computer device and a secure server using a ciphered network protocol. The network protocol may be chosen from a pool of different combinations. The secure communication component may further set a key agreement protocol, and the key agreement protocol may be chosen from a different pool. The secure communication component may set random keys and seeds. Additionally, a protocol syntax and grammar encoder may be randomly chosen for different versions of the secure communication component. Communication layers may be chosen from standard options, such as SSL/TLS, using strong authentication. Alternatively, the layers may be chosen from one or more nonstandard options.

On the server side, a new connection attempt from a user computer device utilizing a previous and/or obsolete version of the secure communication component may be refused and may initiate an update process to update the user computer device to a new version of the secure communication component. A window of last versions may be maintained to allow current connections to be continued with versions older than a most recent version, up to a maximum time set by a global rule defined and/or adjusted, for example, by a security administrator. In an exemplary embodiment, at least two recent versions may be maintained.

Secure Communication Component Bootstrap Loader

Figure 2:
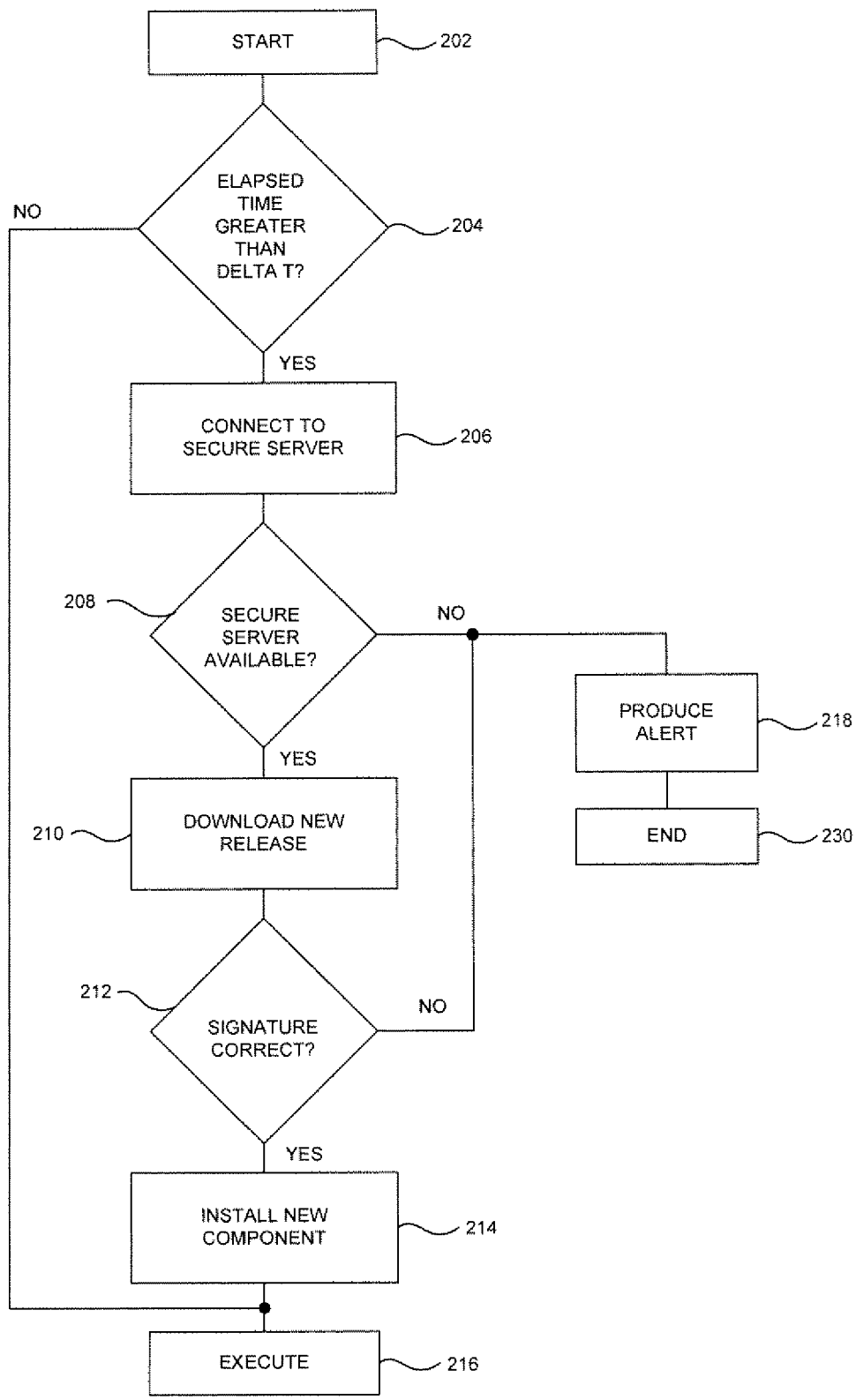
FIG. 2 is a flow diagram showing a process of a secure communication component bootloader according to an exemplary embodiment.

The secure communication component bootstrap loader, or bootloader, may be utilized to download and install a current and/or new version of the secure communication component, when required. Referring to FIG. 2, after starting at step 202, the secure communication component loader is started, at step 202, an elapsed time since a last execution of the secure communication component may be checked, at step 204. The elapsed time check may utilize a local computer device clock, a network time protocol ("NTP") protocol to provide global accuracy and independence from a local computer device, and/or a signal protocol defined by a secure server. The elapsed time value may be compared to a triggering time value ("DeltaT") that may be defined in the code of the secure communication component. The triggering time value may be updated at any suitable time, for example, remotely from the secure server.

When the elapsed time value is above the triggering value, and/or relying on a version checking request to the secure server, a connection is made to the secure server defined by a pool of direct IP addresses, at step 206.

Once connected to the Secure Server, an authentication check is performed to avoid any spoofing or hooking of the server and data, at step 208. The authentication process may rely on any Zero Knowledge protocol, SSL certificates, asymmetric cryptography, or any suitable protocol.

When the authentication and/or connection cannot be validated, an alert may be transmitted to the user, to an administrator of the computer device or network of the user, a survey server, or another entity, at step 218. Thereafter, the process may be stopped at step 230.

When the authentication and/or connection is determined to be valid at step 208, the process may continue to step 210, where a package defining a current and/or new version of the secure communication component and any required direct dependencies may be downloaded from the secure server.

The communication protocol used at this step may define dedicated commands, instructions or variables and values transmitted from the server to the end user computer, the bootloader, and/or one or more components to implement or update settings such as a DeltaT delay, identification and/or addresses of additional or substitute secure servers and/or survey servers, connection parameters, anti-malware databases, and the like.

Once the new package is downloaded, authenticity and integrity of the downloaded package may be checked by verifying a digital signature which may be embedded in the package, at step 212. When the signature cannot be checked and/or is determined to be invalid, the process may proceed to step 218, where an alert may be transmitted to the user, to an administrator of the computer device or network of the user, the survey server, or another entity, and the process ended at step 230.

When the downloaded package is determined to be authentic at step 212, the new version of the secure communication component may be installed at step 214, and thereafter executed at step 216. The installation may include locally updating some or all files of the secure communication component, and the updated files may be located in the downloaded package.

Additionally, the updating may include performance of a test process, where the new updated secure communication component may be tested before performing any communication with any external computer device. When the test process indicates that the downloaded and installed secure communication component is not valid and/or not functional, the component updating process may be performed again beginning at step 202. Further, a different secure sever may be utilized, and/or a security alert may be generated and transmitted to the user, an administrator of the user's computer device, the secure server, or to another entity.

Figure 3:
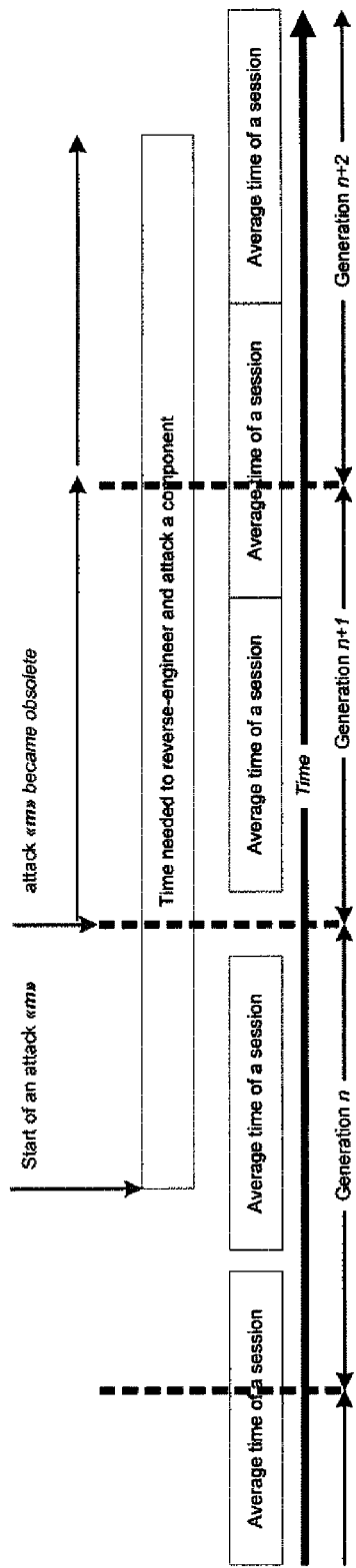
FIG. 3 shows a timeline of creation of versions of a secure communication component according to an exemplary embodiment.

Referring to FIG. 3, and in accordance with the secure communication component updating process described above, an elapsed time between execution of the secure communication component may be defined such that a time of utilization of a particular version of secure communication component may be less than a time required to reverse-engineer, disassemble, deconstruct, or otherwise attack the secure communication component.

Creation of New Version of The secure Communication Component

Figure 4:
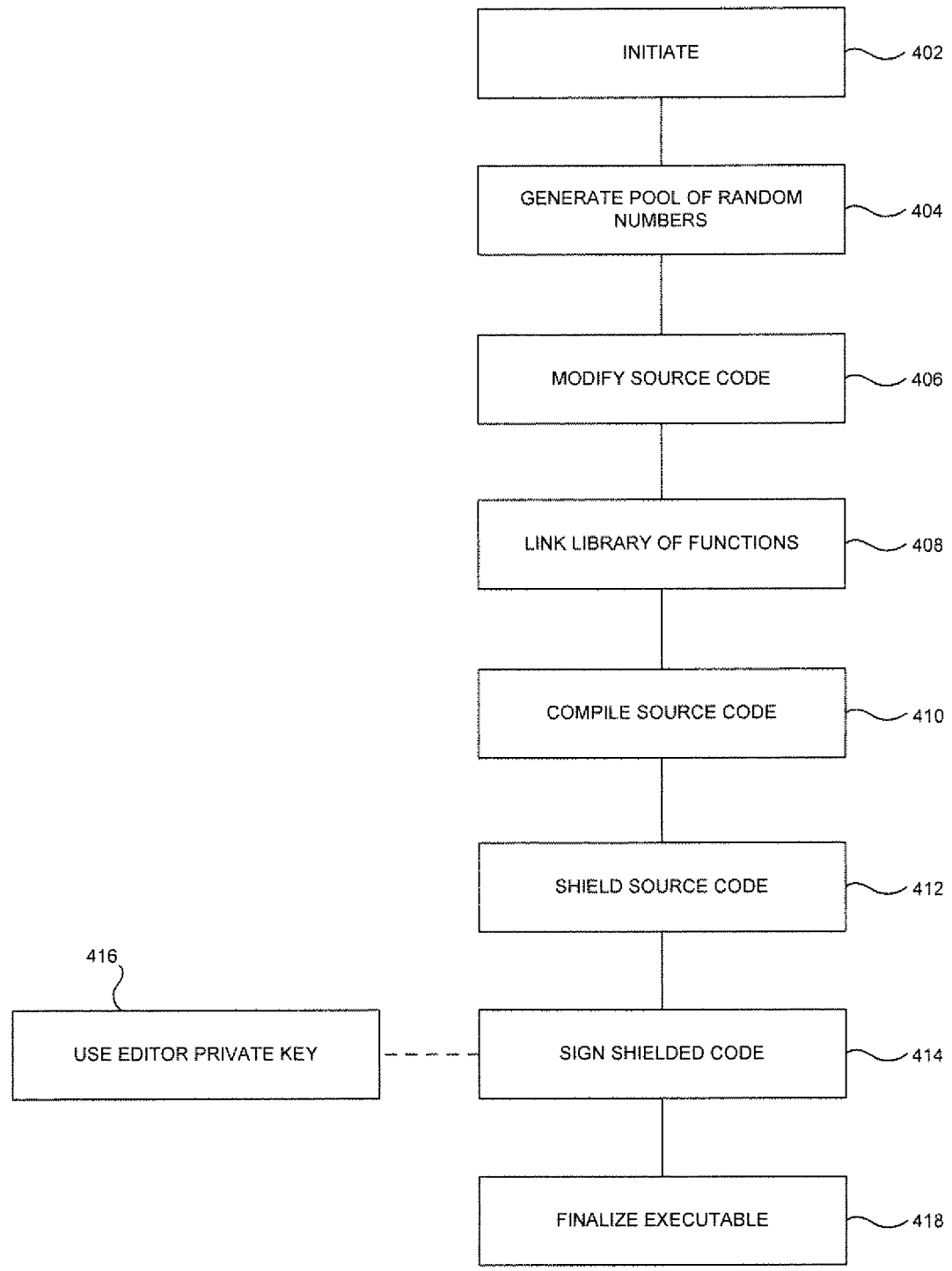
FIG. 4 is a flow diagram showing a method for creation of a secure communication component version according to an exemplary embodiment.

Referring to FIG. 4, each version of the secure communication component may be rebuilt using completely or partially-different source code. In an exemplary embodiment, for instance, the source code of a particular version of the component may include a modification and/or reconfiguration of source code of a previous version of the component, or may utilize a common source code base and additional source code content added to the common source code base. Alternatively, the source code of the newly-generated version may be completely different than the source code of a previous version. Additionally, content added may be based upon an external random seed used to choose functionalities as behaviors.

Accordingly, each version of the secure communication component may differ sufficiently from other versions of the secure communication component that disassembly, deconstructing, reverse-engineering, or other activities performed on a particular version of the component may not be operable to attack a current version. These polymorphic functionalities and behaviors may embed a ciphering model, and the ciphering model may be selected from a library pool, as well as external definitions such as survey server vectors, and the like.

The creation of a new version of the secure communication component may be initiated at a predetermined time, such as at a passage of a predetermined delay period, at the occurrence of a predetermined time and/or date, and the like, at step 402. Alternatively, the version creation process may be launched manually at any suitable time. The time of creation may be variable, and may be defined, for example, on the secure server.

A pool of random numbers may be generated at step 404, and the pool of random numbers may be generated through the use of any suitable mechanism, such as a random or pseudo-random number generator application, algorithm, or device. In an exemplary embodiment, a cryptographic pseudo-random generator may be used to create the pool of random numbers The pool of random numbers may be used, for example, to seed sub-processes and ciphering keys, as described below. The pseudo-random generator may rely on a "Mersenne-Twister," a "Blum Blum Shub," "Fortuna," "Yarrow," or any other suitable cryptographically strong pseudo-random number generator, and may be combined with a stream cipher to extend its period.

Additionally, a pool of ciphering keys may be generated, at step 430. The pool of ciphering keys may be used for the communication protocol, internal resources hiding, selections of functions from the functions library, and the like, as described below. The pool of ciphering keys may be generated using stream ciphers, hash functions and any suitable similar mechanism.

The source code may be modified at step 406. In an exemplary embodiment, the source code may be modified by a source-level polymorph engine. The source-code-level mutation may utilize the generated pool of random numbers, and may conduct the insertion of ciphered resources, seeds, and data into the source code.

A library of equivalent functions may be linked, at step 408. In an exemplary embodiment, for example, the polymorph processor may link a library of equivalent functions to inject noise and/or random code and functions, reorder processes, inject false code and operations, cipher resources and data, implement an API emulator wrapper, incorporate time-shifting delays, incorporate auto-protection functions, and the like, into the source code.

A source-code-level polymorph engine may utilize equivalent functions to perform modifications including: insertion of noise using non-functional instructions into the source code; embedding and usage of variables, mathematical functions, and values; varying and/or utilizing dynamic strings libraries, which may be dynamic or using checked buffer copy to defeat buffer overflows; insertion of jumps to break logic paths, for example jumps to random lines and/or segments of code and/or addresses in memory; inserting time-shifting delays to counter passive and glitching attacks; randomly reordering the source code; insertion and/or reference to API and call wrappings to disallow global analysis and survey, hiding breakpoint attacks between versions; insertion of tracer detection code and traps; insertion of sub-thread generators, tracers, and debuggers avoiders; insertion of fake code, operations, and calls; and insertion of auto-protection systems and verifications, tracers/monitors/debuggers detection and counter-measures, virtual machine detection functions, and the like. The above modifications may be produce a compatible version of the source code, that may be functionally equivalent to an earlier version of the source code, but including significant variation and random elements.

The modified source code may then be compiled to create a binary executable version of the secure communication component, at step 410. Additionally, randomized values of compiler parameters may be utilized during compilation to insert additional noise and variations into the generated object code. A copy of the compiled component may be maintained for use on the server side as a service handler, such that the server's component may be able to decipher and cipher data send from a client side. On the server side, an auto-update process may be started automatically by the bootstrap loader.

The compiled source code may be shielded by a second binary-level code protector, at step 412. The binary executable may be shielded by a binary protection system, as a polymorph encoder and/or a protected compressor. Each version of the secure communication component may be shielded by a different protection system, and the protection system may be chosen randomly or use different builds of the protections application. The selection may be driven randomly using a cryptographic-based random generator such that two successive generated versions of the component do not contain similar characteristics.

In an exemplary embodiment, the second binary-level code protector may include a polymorph engine to inject code protection functions, anti-tracers, and anti-debugger traps; to compress and/or ciphering the binary code; to rewrite code headers, resources, and loaders. Alternatively, a commercial protection system using modified parameters and seeds on each generation may be utilized, for instance software applications such as "ExeProtector," "Armadillo," "SvKp," "Obsidium," "AsProtect," "TheMida," "BeaCryptor," "NtKrnl," or any other suitable application.

The executable and shielded code may then be signed for authentication, at step 414. The signing may utilize an editor's private key, at step 416. Additionally, the newly-generated component may be verified, for instance, by executing the new component on a virtual machine under a quality control robot to detect regression or problems generated by the shielding and protection processes.

Dependencies such as updated elements of other processes, revised anti-malware databases, corrections, and evolution of other parts of the code may be embedded, and the executable may be finalized at step 418. Additionally, in an exemplary embodiment the executable may be signed and/or protected using an integrity-checking system integration and/or signature.

The newly-generated secure communication component may then be made available. In an exemplary embodiment, for instance, the newly-generated component may be copied to a public area of auto-update servers, allowing a remote bootstrap loaders to download and use it as a current secure communication component. A synchronization process may be utilized to ensure that all visible secure servers embed a correct version of the component, or be hidden from the list of available secure servers when a correct version is not embedded, for instance using load balancing and verification processes such as availability, charge, state, content control, and the like.

Communication rules and/or protocols may be reset and/or modified at various times. Each time a new secure communication component version is created, a bootstrap loader located on the client side may download a new version of the component and validate it before using it to communicate over a fully secure channel. Any previous version of the secure communication component may thereby become obsolete, and may be deleted locally. Accordingly, attempts to analyze, trace, debug, reverse-engineer, and/or disassemble the secure communication component may be defeated by encountering a newer version of the component, necessitating restarting of such activities at the creation of each secure communication component version. The frequency of version creation may be set such that creation of versions occurs more rapidly than a time required to attack each such version. In an exemplary embodiment, time elapsed between versions may be set to a value that is approximately half as long as would be required to successfully attack the component.

Utilization of the Secure Communication Component

In an exemplary embodiment, when a user connects to a site such as a online bank site, a commercial site, and/or a similar location using a computer device, the user may be directed to log in by providing identity credentials, for instance, a username and/or password information.

The user may be required to utilize the most recent version of the secure communication component to communicate with the location. In an exemplary embodiment, for instance, the network protocol used to send login information is defined only by the current version of the secure communication component. Accordingly, the defined network protocol may be the only protocol the corresponding component on the server side will accept for data communication with users.

On the side of the server, the received data may be reallocated according to the current protocol syntax and/or grammar definition, using a static and blind block handler such as a buffer overflow avoider. Any error, for instance, a use of an incorrect protocol, may cause the connection attempt to be refused and/or the connection to be discarded by the server.

A user may automatically download the component on each initial connection to the sensible server, for instance, when accessing a log in page of the sensible server. While the login page is loaded, and a new component may be downloaded from the server, other suitable security schemes may be applied, such as generation of a random number as a salt value for the specific user session.

Since a standard session may be opened before a new component version is set, legitimate opened sessions may be maintained for a period of time during which a new version is being generated and deployed.

The ciphering protocol used on any protected server may understand and/or be able to communicate with a current version of the protocol, as well as with a prior version in use by remote previous versions of the component on opened connections. Accordingly, at any particular time, a server may be able to answer and/or communicate with remote computer devices using an immediately-prior version of the protocol, as well using a current protocol corresponding to a current version of the secure communication component. Accordingly, at least two techniques may be used to allow multiple communication protocols to exist concurrently on a protected server.

In a first technique, at least two different versions of a protocol may be embedded in the same component. A first version of the protocol may relate to a previous protocol version and may be used to communicate with components of the previous version. A second version of the protocol may relate to a current protocol version, and may be used to communicate with components of the current version. Accordingly, a "state-full" generation of the component source code for the server side may embed at least two sets of security models including ciphering layers, ciphering keys, protocol handlers, tokenizers, and the like.

In a second technique, at least two different versions of successive communication components may operate on a protected server, each of the versions listening for a corresponding version of remote clients. The protocol may be globally encapsulated, which may expose a version tag in clear above any ciphering streams, a different network port dynamically switched between generations from a selection pool, a dynamic TCP/IP address dynamically switched between generations from a selection pool, and/or a virtual server naming declination.

The secure communication component may embed an API and functions allowing engaging of a secure connection to the sensible server. Additionally, the user computer device may be checked against DNS and redirection hacks, for instance, using a scan and analysis of the anti-malware component as described below.

Above the API, the secure communication component may use a local computer identification based on a hardware footprint to generate a "ComputerUID," relating to the computer device, and a "UserUID," relating to the user. The identification may be exported to a sensible server. The ComputerUID information may include large-integer values useful for identifying a computer device, and may lack human identification data or any personal information operable to identify a user. In an exemplary embodiment, for example, the ComputerUID may include a hash code of a serial number of a motherboard of a user computer device, linked with the processor serial number, and combined with other similar non-volatile information. The UserUID may include a hash code of a GUID associated with a user on an operating system, linked to a session name used to start a session, for example.

Operation of the Secure Communication Component

Figure 5:
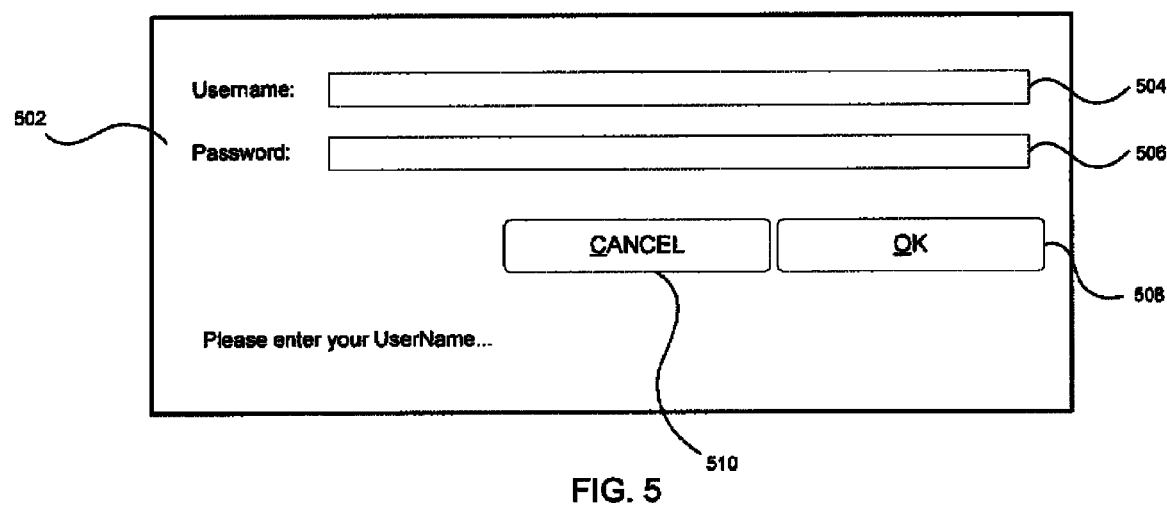
FIG. 5 shows a login interface of a secure communication component according to an exemplary embodiment.

Referring to FIG. 5, the secure communication component may display a login interface to the user. The login interface may include, for instance, a graphical dialog box 502, a text entry field for a username 504, a text entry field for a password 506, an "OK" button 508, and a "cancel" button 510. When the secure communication component is executed and/or instantiated, the login interface may be displayed in a html page of a web browser software application, for instance substantially in the form of conventional login and password fields and buttons.

Internally, a version of the secure communication component may start by launching an anti-malware component scan in the background, checking for threats on a user computer device, and/or checking a stack of keyboard drivers to detect keylogger applications and the like. At a detection of any threat, the secure communication component may send information regarding detection and/or identification of the threat, along with other information such as the ComputerUID and/or UserUID, to the server, and may stop the process. Additionally, whether the secure communication component is running under any kind of virtualized machine, such as "Virtual PC," "VMS," "VMWare," "VirtualBox," and the like, or with a debugger and disassembly tool in memory may be detected in a similar fashion. The user may enter a login name, password, and/or other log in identification information.

The secure communication component may implement detection and/or interception of trojans and keyloggers, for instance by using the anti-malware component engine, as described below.

Password input may be protected through the use of virtual keyboards, user-selected pictures, applications such as "SiteKeys," and the like. Additionally, low-level detection may be performed by starting a sub-process to identify low-level messages and/or keyboard interception using a low system process-wide DLL injection while the login interface is loading.

Very low level interception may be performed by silently installing a driver on the user operating system when the login interface is shown on the screen. This driver may be managed as a service and may intercept all keyboard input at the lowest level possible, for example, Ring0. The driver may cipher keyboard input before sending the result directly to the secure communication component using inter process communication ("IPC"), or any direct communication manner, bypassing other drivers, applications, and keyloggers.

One or more alternative user identification mechanisms may be employed, to ensure that no sensitive identification or other information is transmitted or made available as clear data outside of the secure communication component. In an exemplary embodiment, for instance, user username and/or password information, or other login identification information, may include a one-time pad password based on one or more Vernam/Mauborgne grids. A random seed may be utilized to generate a grid of numbers, symbols, signs, and the like, as well as at least one delta value. Using a large stream of random values, for instance from a cryptographic random number generator on the secure server, each seed associated with a user may define a starting position in the random stream, thereby defining a first sign of the user's grid, for instance as an initialization vector ("IV"). The at least one delta value may define a number of positions to skip to get a next grid value. A new grid may be generated based upon these two values, without regeneration of a full stream of random data. Many users may share the same stream of random values at the same time. The size of the stream may be calculated using a number of users, and a number of combinations to generate before a global reset of the stream, at least the number of grids to generate for a lifetime of the random stream. The grid may be sent to the end user, and each time a login is required, a series of random values may generate a unique list of grid coordinates. The user may then type in corresponding signs, numbers, and/or symbols visible on the user's grid as a password, which may be checked on the server side using the seed used to build the grid. Grids may be stored or distributed in any suitable form, for example, by printing and delivering in paper form, via electronic mail, and the like. The grid may be revoked by generating a new user's associated seed and delta values on the server side and sending a new grid to the user.

In an alternative exemplary embodiment, biometric and/or biometrically-derived passwords may be implemented. A password may be generated and recognized not only by characters and/or symbols typed on a keyboard or input device, but also by capturing and reading relative delays, elapsed time, and rhythms between an entry of each of a plurality of alphanumeric characters and/or symbols, for instance by typing on a keyboard. Different users use the keyboard differently, and may differ in typing speed and rhythm, and such differences may be recognized, stored, and analyzed to identity particular users.

In an alternative exemplary embodiment, virtual keyboard input may be used to simulate a keyboard on a screen where keys may be scrambled and the user may use an input device such as a mouse to select and click each key to type identification information such as a username and/or password. Additionally, the virtual keyboard may utilize results of one or more scans performed by the anti-malware component of known screen-scrapers in memory. Further, by randomizing starting coordinates, size, color schemes, and by moving the input device in an out of a protected area each time a key is clicked, screen grabbing may be disabled by using the DirectDraw APT at a low level. Additionally, fake clicks and type may be generated to produce "noise" to confuse and/or corrupt information collected by a screen grabber and/or recorder.

Additional alternative mechanisms for entry of user identification information include use of CodeBook models, Hash chains, Kerckhoffs codes, and the like. Additionally, reuse of known passwords may be limited.

Furthermore, an authentication API may be utilized to allow interfacing hardware or software applications offering authentication to the secure communication component, for instance by using a programming interface locked by a key provided by the editor to registered software programmers. The authenticating API may export a set of values generated by the existing software/hardware to the secure server, allowing it to match user definitions. The authenticating API may be oriented later upon specifications of other workgroups such as the "Open Authentication Initiative," and the like.

Anti-phishing Component

The anti-phishing component may be activated when a user clicks on a hyperlink and/or other element embedded in an electronic communication, such as an email. In the present application, the anti-phishing component may be referred to as the "TRAPS component."

In an exemplary embodiment, the anti-phishing component may be utilized to mitigate and/or prevent negative effects of users interacting with fraudulent or invalid communications, such as electronic mail messages. Such invalid communications may contain links, such as HTTP hyperlinks or other embedded objects, which may direct the user to fraudulent computer devices or websites posing as legitimate devices or websites. Such fraudulent sites may contain solicitations or invitations for users to enter sensitive confidential information such as usernames, passwords, financial information, credit card details, addresses, social security numbers, and the like, and the entered information may then be used by malicious entities for illicit purposes.

The anti-phishing component may analyze the context of the electronic communication, the embedded link and/or other object, and one or more target locations indicated by the embedded link and/or object. The anti-phishing component may further analyze the content of a website or other location indicated as a target by the link and/or element, and determine whether the communication, link and/or object is fraudulent. In an exemplary embodiment, the determination may be performed without additional connection to or reference of a blacklist or IP/URL databases.

When the link and/or element is determined to not be fraudulent, the user may be directed to the website and/or location indicated as a target in the link and/or element. When the link and/or element is determined to be fraudulent, the user may be rerouted to a legitimate and authenticated web site or location. Additionally, further analysis of the website and/or location indicated as a target may be indicated. In an exemplary embodiment, the determination of whether a link and/or embedded element is fraudulent may be based on a set of knowledge rules implementing various forms of spoofing techniques presently known, and/or upon reference to a negative test database defined by the user's protected perimeter, as described below.

A protection field dictionary ("PFD") may be utilized, and the PFD may include a document including definitions and knowledge about one or more entities to be protected, as described in detail below. Additionally, A protection field perimeter ("PFP") may be created for each user, and the PFP may describe a list of relevant PFDs for each particular user, as described in detail below.

Installation of the Anti-phishing Component

The anti-phishing component may be designated as a default HTTP and HTTPS protocol handler of a computer device operating system, and thereby may be operable to hook all events upon activation of such protocols. The anti-phishing component may also utilize a browser helper object to intercept URL clicks from a web browser software application. Accordingly, the anti-phishing component may passively supervise and analyze activation of HTTP URL clicks at an operating system level without requiring user interaction, disruption of user activity, and/or usage of significant system resources.

Activation of the Anti-phishing Component

During a session, the anti-phishing component may remain in a standby and/or dormant state, waiting for an event to be activated. Such an event may include, for instance, the user clicking on or otherwise selecting an HTTP URL link and/or other embedded object located in an electronic mail message.

In an exemplary embodiment, for example, when a user clicks on one or more hyperlinks in the body of an electronic mail communication, the anti-phishing component may check the context of the electronic mail, the destination of all URLs embedded in the electronic mail message, and the content of websites targeted by the one or more embedded URLs. The anti-phishing component may then follow algorithms to insure the reliability of these target websites, as described below.

Figure 6:
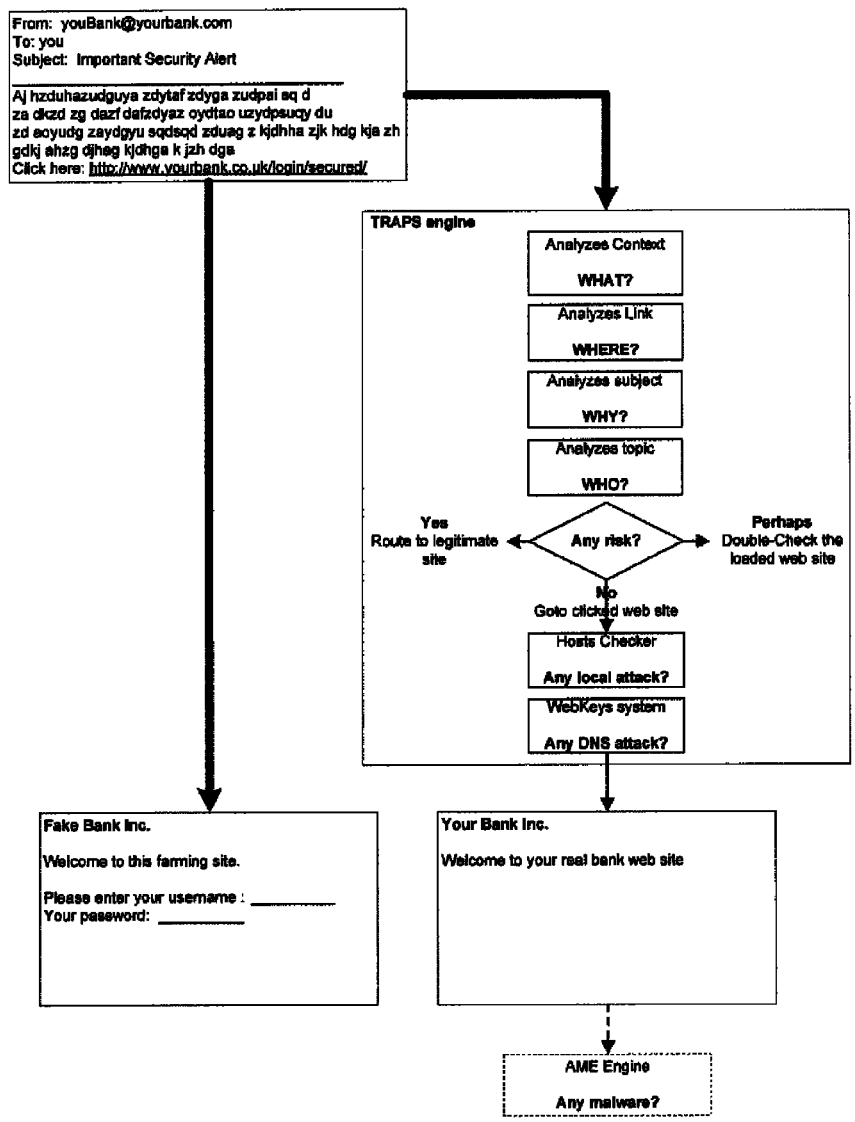
FIG. 6 is a flow diagram showing a general workflow of an anti-phishing component according to an exemplary embodiment.
Figure 7:
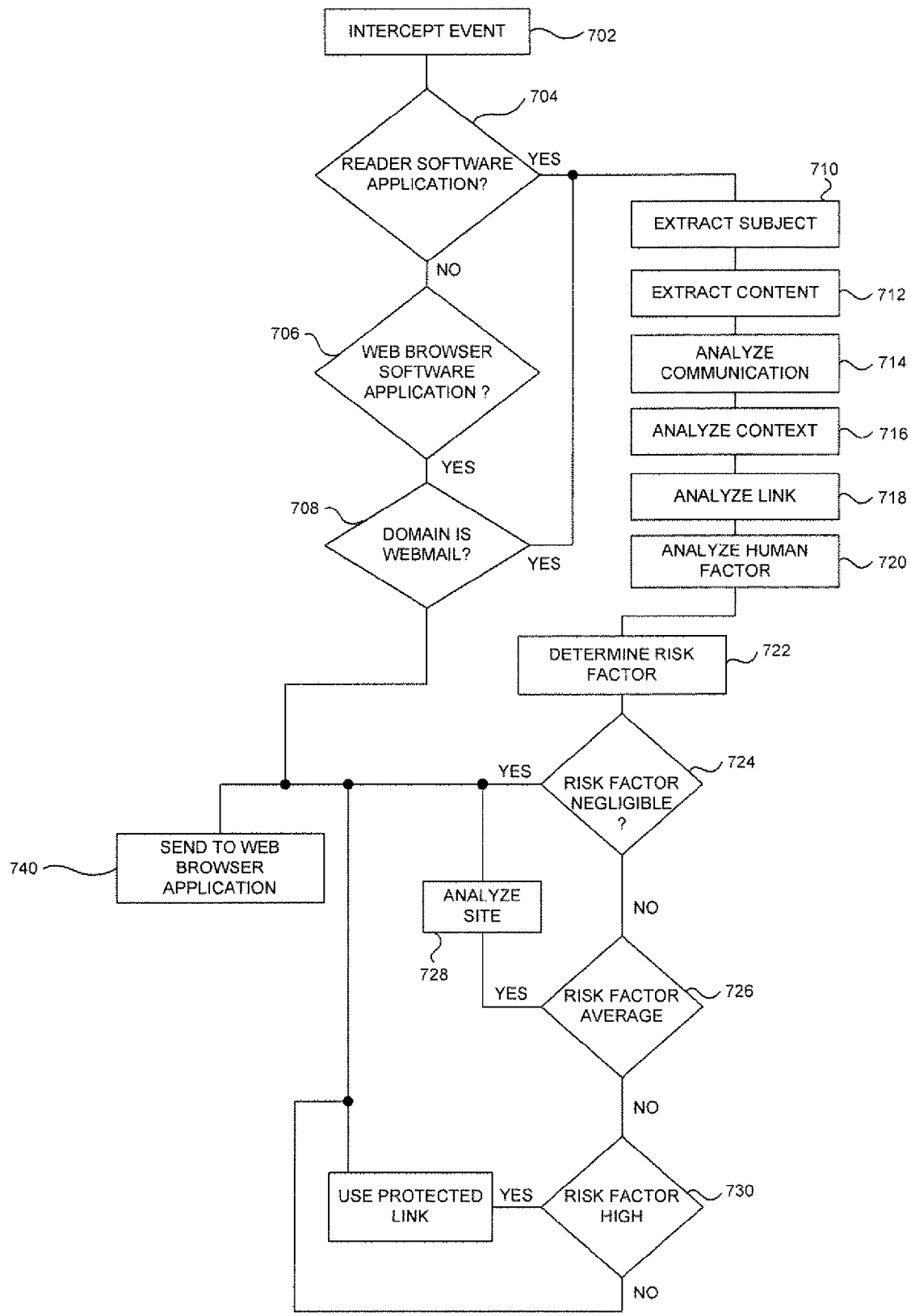
FIG. 7 is a flow diagram showing a process of an anti-phishing component according to an exemplary embodiment.
Figure 8:
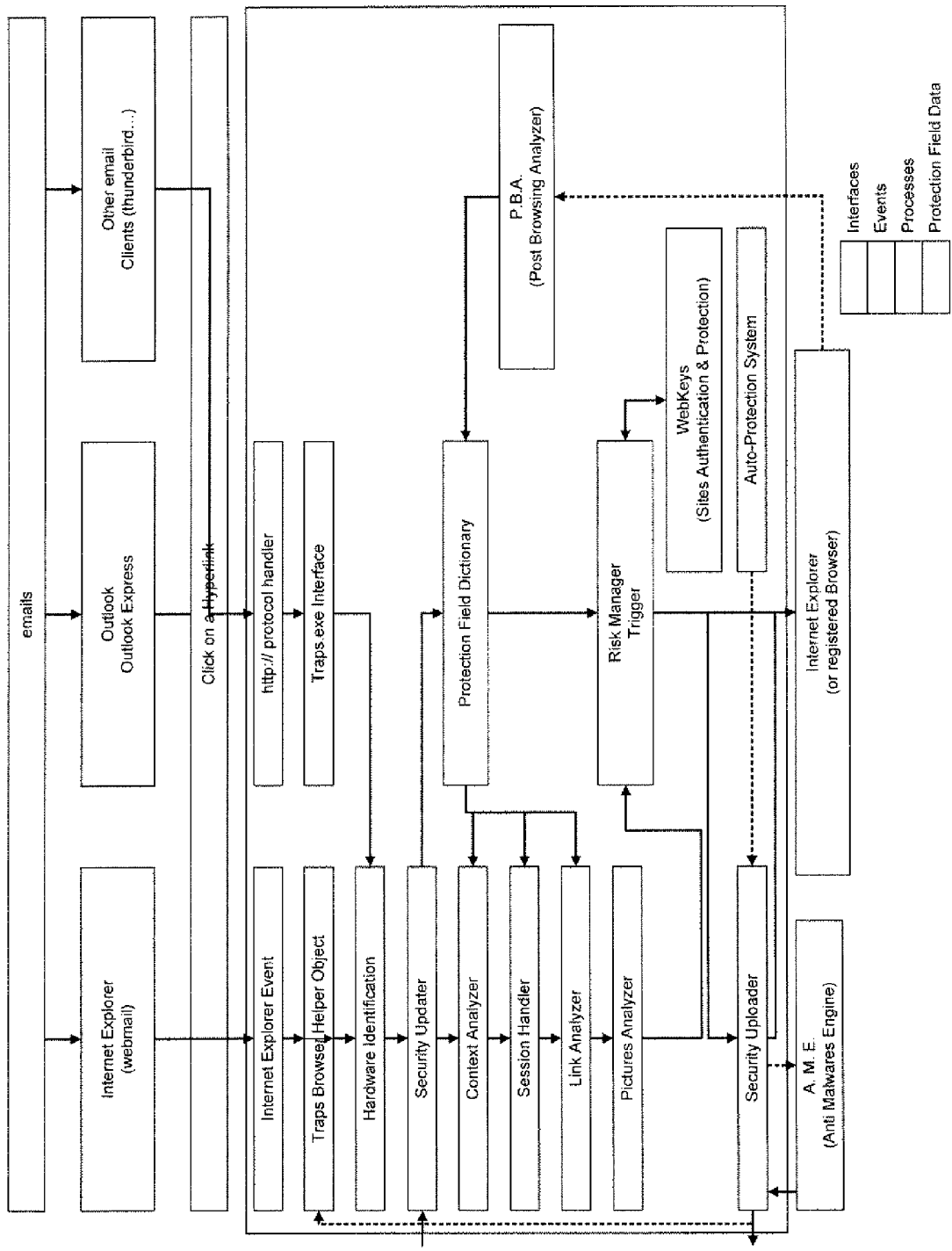
FIG. 8 shows an alternative illustration of the component architecture of an anti-phishing component according to an exemplary embodiment.

The anti-phishing component may perform comprehensive context profile recognition around one or more websites and construct an appropriate individual safety-controlled perimeter for each such website, to facilitate the detection of any attempt to usurp or violate this perimeter, as described below Analysis of Communication FIG. 6 illustrates a general workflow of an anti-phishing component according to an exemplary embodiment. Referring to FIG. 7, upon clicking and/or otherwise selecting a link or other object embedded in an electronic communication, the anti-phishing component may intercept the event, at step 702. Such an interception may prevent the computer device, for example through a web browser or electronic mail reader software application, from communicating with the target location specified by the link or object, pending further analysis as described below.

In an exemplary embodiment, the click and/or other selection of the link or other object may be performed by the user activating a pointing device such a mouse to move a cursor on a display of the computer device. Alternatively, the user may select the link or other object through the use of keyboard keys, a pointing device, a voice recognition system, or any other suitable mechanism for selecting objects in electronic communications. Thereafter, the anti-phishing component may identify the computer device and the user, for instance using the identification data utilized by the secure communication component described above.

The anti-phishing component may then determine if the application displaying the electronic communication to the user is an electronic communication reader software application, such as an electronic mail reader, at step 704. If the application displaying the electronic communication is not an electronic communication reader application, then the anti-phishing component may determine if the application displaying the electronic communication is a web browser software application, for instance, an application that may be capable of displaying web-based electronic communications to users, at step 706. If the application is not a web browser software application, then the user may be allowed to follow the target specified in the link and the user may be redirected to view the target of the link and/or embedded object, for example, in a web browser software application, at step 740.

When the application is determined to be a web browser software application, a determination is made whether the domain is a web-mail domain, at step 708.

When the result of the determinations of steps 704 and/or 708 is affirmative, then the process proceeds to step 710, where the subject of the electronic communication containing the link and/or embedded object may be extracted, and thereafter to step 712, where the content of the electronic communication may be extracted. The extraction of the subject and content of the electronic communication may be performed, for instance, by using, analyzing, and/or reading a document object model ("DOM") exposed by a web browser software application to obtain a tree of this communication document including text and HTML data.

After extraction of the subject and content of the electronic communication, the electronic communication may be analyzed at step 714. The analysis of step 714 may include, for example:

determining whether the selected link and/or object is embedded in an electronic email or other type of electronic communication;

detection of the location and size of any images contained in the communication;

detection of visible and invisible parts of the electronic communication, calculating distances between foreground and background colors of each block of text, area, and zones of the document, to detects if some parts are deliberately hidden to the user and/or able to spoof filters; and/or analysis of images contained in the electronic communication using an embedded picture recognition algorithm able to detect, recognize, and identify logos from entities having protected perimeters, as well as re-sampled, re-sized, deformed, and modified logos or pictures.

The anti-phishing component may then analyze the context of the electronic communication, at step 716. The analysis of the context may include, for instance:

analysis of words contained in the electronic communication, for instance by using one or more dictionaries of words generally used to spoof users such as words regarding security problems, accounts, closings, referencing financial entities, as well the words defined by the PFD such as protected websites or entities, and words seldom used in phishing attempts;

determination of a quantity and/or percentage of words commonly used in phishing and/or spoofing communications with respect to the total size and content of the communication;

analysis of links contained in the electronic communication, and analyzing text used to reference or explain the links to the user, including comparison of the targets of the links and descriptions of the links provided to the user; and/or analyzing a format, layout, and/or presentation of the electronic communication as compared with the content of the electronic communication using standard rules such as those commonly utilized in electronic communications of the protected entities which are defined into the protected perimeter rules, as well as the number, size, form ratios of tables, and other presentation settings permitting the categorization of an electronic communication.

The analysis items described above are merely exemplary, and the items and criteria identified and analyzed may be updated and/or modified at any time to adjust to changing technology.

Analysis of Selected Link

After analysis of the context of the electronic communication at step 716, the link and/or object selected by the user may be analyzed, at step 718. The analysis of step 718 may include, for example:

Detection of encoded links, such as URLs, Unicode, and the like. Forms of URL encoding and rewriting may be detected and decoded;

Detection of redirection of TLDs and domains. A list of known redirection domains, dynamic DNS resolvers, and free hosting services may be referenced;

Detection of dangerous TLDs. IT perimeters of the protected entities may be referenced to determine geographical locations and countries which do not host any servers of the protected entities, indicating that a URL pointing to these locations may be a phishing attempt;

Detection of spoofed links by using generic rules describing techniques utilized by malicious entities;

Detecting sub-redirected links;

Sorting of regular and/or improperly formatted links. IT perimeters of the protected entities may be referenced to determine which entities utilize URL rewriting, and which rewriting technique may be used, and a comparison between link format and rewriting techniques may be performed;

Detection of username spoofing to identify attacks based on a "Username:Password@" syntax of the HTTP protocol;

Detection of direct IP links, to determine if the embedded link and/or object points to a direct IP;

Detection of protected targets by analyzing the tree of the URL and comparison of the tree to valid domain names and root names of protected entities as specified in the PFD;

Detection of content distribution network ("CDN") attacks by identifying URLs not recognized as phishing links by other link blocking resources;

Detection of mistyped and/or misspelled links by utilizing various distance matching algorithms to identify mistyped and/or misspelled names and URLS, relying on "Levenshtein," "Damerau-Levenshtein," and other suitable algorithms;

Detecting "warez" type mistyping of links and/or objects using a fuzzy pattern matching algorithm to decipher "warez"-type spelling and link formation;

Detection of phonetic meanings in textual links, using a modified metaphone, a double-metaphone, and/or a Shannon tree algorithm;

Detection of companions' links by searching known root names and derivatives from the above algorithms in the given URL to match any companion links;

Detection of known and unknown domains by analyzing a hierarchy described by the link and matching root names of the PFD to detect fraudulent forms of spoofed domains;

Detection of free hosting services by referencing one or more lists of free hosting services specified in the PFD;

Detection of dangerous countries by using current data from anti-phishing workgroups and other resources;

Detection of generic phishing kits by analyzing URL formats; and/or

Checking hidden redirection by the local host file.

Analysis of the subject and topic of the human factor may also be performed, at step 720. The analysis may include determination of a motive for the transmission of the electronic communication and comparison of the motive and/or subject with the content or target of the link and/or embedded object. The analysis may also include determination of who transmitted the electronic communication, and the identity of the sender may be compared with the content of the link and/or object as well as the determined motive and/or subject of the electronic communication.

Calculation of Risk Factor

Upon completion of one or more of the analyses described above, the anti-phishing component may compute and/or update a risk factor using a heuristic algorithm, and determine a corresponding risk factor to the user, at step 722. In an exemplary embodiment, determination of risk to the user may be performed by a risk manager module. The computation may include determination of a level of danger corresponding to the link and/or embedded object, and the level of danger may be expressed as a percentage. The danger may include redirection to a malicious location, an attempt to obtain sensitive information from the user, and the like.

In an exemplary embodiment, the risk factor may be determined to be relatively high, relatively low, average, or negligible based upon the risk factor expressed as a percentage. For example, a risk factor greater than 50% may be determined to be a high risk factor indicating a high level of danger to the user, whereas a risk factor below 1% may be considered to be a negligible risk factor. These values are merely exemplary, and may be adjusted at any time depending on changes in circumstances and/or advancements in security technology.

When, based upon the determination of the level of danger to the user, the link is determined to have a negligible risk factor at step 724, the user may be directed to the target location specified by the link and/or embedded object, at step 740, and the link and/or embedded object may be sent to, for example, a web browser software application for navigation by the user, at step 740.

When, based upon the determination of the level of danger to the user, the link is determined to have an average risk factor at step 726, the user may user may be directed to the target specified by the link, and the link and/or embedded object may be sent to, for example, a web browser software application for navigation by the user, at step 740. In an exemplary embodiment, a post browsing analyzer module may be launched as a second pass process to further analyze the link and/or embedded object at step 728.

The post browsing analyzer may be started as the web browser software application loads the target web site. Thereafter, the post browsing analyzer may wait for the web browser application to load the targeted web site, and then analyze the content of the loaded website to determine if it is a valid website or a false site potentially utilized for phishing purposes. The use of the post browsing analyzer allows detection of framed hidden redirections, spoofed and/or grabbed resources from the original web site, and static and/or dynamic redirection or hosting of the web site. Texts, forms, logos, and pictures of the valid protected web site may be identified and detected as generic resources commonly used to steal information through use of input fields, password fields, references to login information or orders, and the like. When the site is determined to be a false site, the risk factor may be raised.

The analysis of the post browsing analyzer may be conducted before an entire page and/or location is loaded, and an internal timer may be used to check for a "time-out" attack. The loaded buffer may be matched at regular time to check for the nature of data already loading. When the result of the analysis of the post browser analyzer indicates a need to raise the risk factor to a higher level, then the web browser software application may be immediately redirected to the valid protected link as provided by the PPD before the user is allowed to perform any further navigation on the suspect site and/or location. A time-out attack may be detected if the fields and data were detected while a different entropy came regularly by chunks. This feature may allow the component to "fail" in a first step, allowing biases generated by the accuracy factor of the heuristic engine, and thereafter to correct itself in the case of a well crafted and undetected phishing attempt.

When, based upon the determination of the level of danger to the user, the selected link and/or embedded object is determined to have a high risk factor, the link and/or embedded object may be categorized as a phishing attempt, and the user may be redirected to a valid, known protected link, at step 730, for example, through the use of a web browser software application, at step 740. A valid, known protected link may be determined, for example, by comparison of the selected, high-risk-factor link with known valid targets as identified in the user's PFP.

A valid site may be determined, for instance, based on information in the PFD and the analysis of the email body. Words such an entity or corporate name, slogans, advertising information, and/or an industry or field of business may be matched. Additionally, elements such as recognition of logos, trademarks, letterhead, and other graphical indicia may be recognized and matched to identify a valid entity referred to in the electronic communication. Further, similarities between the activated link or its human-visible description may be compared with the entity's usage of domain names, such as the entity's usage of companioning, brand names, domain names parts, mistyping, warez forms, rewriting, and the like.

Results of these recognitions and matching may be utilized to indicate an identity of at least one entity that is being spoofed or targeted by the communication. After identification, a default link defined in the entity's PFD may be used to rewrite the activated link in memory. Each PFD may contain a default link to a legitimate web site to be used in case of a phishing attempt, and this link may point to a dedicated page of the legitimate web site designed by the entity to handle phishing attempts, or to any other suitable location.

Accordingly, in an exemplary embodiment, the anti-phishing component may be activated from a dormant state by a click on an link, and may intercept this event and all parameters of this event including an indicated URL, at a very low level. The indicated URL may be rewritten before passing it back to the default web browser software application to direct the user to a legitimate and certified location.

Further, upon identification of the link and/or object as having a high risk factor, a security updater module may upload the link to a survey server for future reference. A message identifying the high-risk link and/or object and the circumstances of the redirection may be transmitted to the user and/or to an administrator of the computer device of the user.

Additionally, an entity associated with the valid website or location may be informed of the phishing attempt, and/or provided with details of the link analysis and redirection described above. When the user is directed to the valid location, a tracker allowing the targeted entity to be informed that the user has been redirected may be embedded, for instance, by using a URL parameter, a previous request, a dedicated link, and the like. Furthermore, the link used by the anti-phishing component to redirect the user may be added to the PFD.

Protection Field Dictionary and Protection Field Perimeter

A protection field dictionary ("PFD") may include a document including definitions and knowledge about one or more entities to be protected. A PFD may be specific to a particular entity, or a general PFD containing characteristics of a group or collection of entities may be used. The one or more entities may include, for example, financial institutions, commercial entities, government entities, academic entities, and the like. The protected entities may typically be large entities that receive and transmit relatively large quantities of electronic communication, for instance via a website or other location accessible on a public data communication network; however, an entity of any size and structure may also be a protected entity.

The information in the PFD may include: specific known prior attacks; generic attack characteristics; generic keywords, forms, and/or models used in corporate emails and web sites; characteristics of protected web sites; obsolescence delays between auto-updates and their settings; fuzzy vectors of corporate logos for use, for example, in picture recognition algorithms; lists of legitimate domain names of the protected entity, countries of operation and/or server location of the protected entity, and the like; and/or key details describing a public IT area for the protected entity.

This information may be maintained on a security server, and may be contained in a file which may be sharable with one or more components, for instance, via a network such as the Internet. The PFD may be compressed, ciphered, encoded, and digitally signed. Attempts to delete, move, patch, forge, tamper, or regress the PFD may be detected, neutralized, and corrected, and reported to the security server, to allow convenient, dynamic, and rapid updating and modification of the information in response to changing technological conditions and evolution of computer device security strategy.

A protection field perimeter ("PFP") may be created for each user, and the PFP may describe a list of relevant PFDs for each particular user. Alternatively, a general PFP may be created for a group and/or class of user. The PFP may be maintained automatically, and a list of PFDs of entities of interest to the user may thereby be assembled, allowing protection of all entities, such as corporations, banks, retailers, and the like, with which the user communicates and/or interacts.

Each entity may utilize a particular pattern of maintenance and update of an associated PFD, depending for instance on the size of the entity, as well as a volume of activity of the entity, business models of the entity, industry of the entity, location of the entity, and the like. Modification and/or update of the PFD may be made at any suitable frequency, for instance, daily, monthly, yearly, and the like. Alternatively, the PFD may not require adjustment. All PFDs in a particular user's PFP may be auto-updated from the secure servers when corresponding PFDs are updated.

A MIME type (e.g., "application/traps-PFD") may be defined on the computer device of the user, for instance at a time of installation of the anti-phishing component. Accordingly, PFDs may be automatically downloaded and/or updated from a webpage or other location of a protected entity. In an exemplary embodiment, for example, a user browsing a payment acknowledgement page of a protected merchant website may download the merchant's PFD, and the downloaded merchant PFD may be added automatically to the PFP of the user. Alternatively, the user may download the merchant's PFD from the merchant, for instance by selecting a link presented on a webpage of the merchant.

Accordingly, in an exemplary embodiment, a PFD may be associated with each of a plurality of entities. A PFP template may define a perimeter for a user, and may contain one or more of the PFDs, thereby identifying legitimate entities of the users' interest. Accordingly, the anti-phishing component may determine if the target location specified in a selected link is consistent with the PFP, and therefore the users' interests, and may use a result of the determination to raise and/or lower a risk factor for the link.

Anti-malware Component

The anti-malware component may include one or more anti-virus scanners containing one or more databases containing known threats. Using processes regarding memory and objects scanning, the one or more anti-virus scanners may be able to detect hidden threats by their traces, for instance, by scanning a registry, startup entries, paths, folders, opened ports, mutex, and behaviors. Throughout the present application, the anti-malware component may be referred to as the "AME" component.

Figure 9:
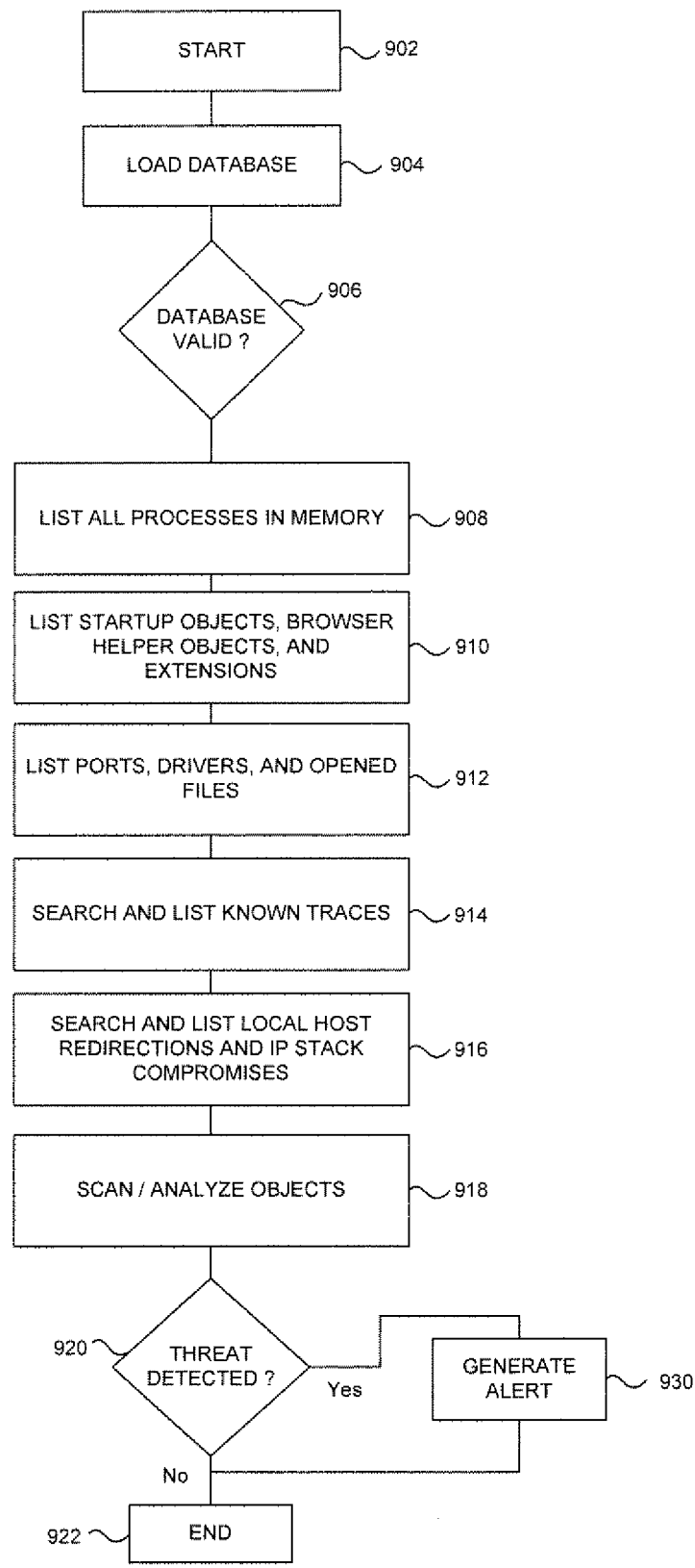
FIG. 9 shows an process of an anti-malware component according to an exemplary embodiment.

Referring to FIG. 9, the anti-malware component may be started on a user's computer device at step 902. One or more malware/threats databases may be loaded at step 904. Each malware/threats database may include a compressed and digitally signed file containing identification information related to known malware and threats. The malware/threats database may be validated, authenticated, and checked for tampering, regression, or modification, at step 906.

When the malware/threats database is not authenticated and/or not determined to be valid, one or more alerts may be created and transmitted to the user, to an administrator of the computer device of the user, to a server, or to another entity at step 930, and the process may thereafter end at step 922. The alert may include one or more of a graphical object, a text message, an entry to a log file, an electronic communication, and the like. The use may be prompted and provided with instructions regarding how to obtain an authenticated and/or valid malware/threats database.

When the malware/threats database is authenticated and determined to be valid, a list of all processes in memory may be created, and dependencies of each of the processes may be extracted as a list of corresponding files, at step 908. The list may be sorted by the paths of each process, and/or by filename. Each object may be provided to an object scanner which may use the malware/threats database to scan for known threats. The object scanner may include a detector engine driven by a knowledge base and operable to scan memory, registry, mutex, startup objects, BHO and extensions, handles, hooks, files, TCP/IP stacks, and the like.

An infection score may be determined and/or updated based upon the scanning, and the infection score may be used to produce one or more summary of results. The object scanner may identify threats using anti-virus techniques, such as md5 identification of files, identification of executable sections, performance of fuzzy searches using one or more binary pattern matching trees, mutex detection, registry scanning, paths and files detection, detection of opened TCP/IP ports, and the like.

After the listing of processes at step 908, a list may be created of startup objects, including a list of all files loaded while starting the operating system or its direct dependencies, as well as browser helper objects including extensions of web browser software applications and operating system desktop components, at step 910. Opened, listening, and connected network ports, drivers and TCP/IP stack drivers, as well as files opened by hidden and non-hidden processes may be listed at step 912. Known traces such as paths and folders created by known threats, keylogger record files, viruses markers, and the like, and mutex known to be created by malware may be searched and listed at step 914. Local host redirections and IP stack compromises may be searched and listed at step 916.

All objects listed as described above may be scanned and/or analyzed, at step 918. The local hosts file may analyzed to detect any suspicious redirection, and the IP stack may be analyzed to detect any compromise.

A determination of whether a threat is detected may be made at step 920. When a threat is detected, one or more alerts may be created and transmitted to the user, to an administrator of the computer device of the user, to a server, or to another entity, at step 930, and the process may end at step 922. In an exemplary embodiment, when a threat is detected, the anti-malware component may reroute the user to an advisory page or message, informing the user of the threat detected, and offering a solution or direction to a resource for further research. Additionally, the survey server may be notified and provided with identified threats.

Website Authentication Component

In conventional public data communication networks, such as the Internet, identities of computer devices on the network may be determined by names or numerical TCP/IP addresses. The numerical TCP/IP addresses may be mapped to names represented in human-readable text. Low level drivers typically rely on TCP/IP addresses, while high level applications typically use domain names for authentication purposes, as address lists are harder to create, understand, and maintain by humans than domain name lists. Accordingly, spoofing of the identity of a computer device and/or entity may be accomplished by changing the mapping between a low level TCP/IP address and its high level domain name. After such spoofing, an authenticator may not be able to distinguish between a valid entity and a spoofed and/or invalid entity without resorting to significantly CPU-intensive and costly cryptographic layers and certificates which may be difficult to administer and maintain. Throughout the present application, the website authentication component may be referred to as "the WebKeys component," and a certificate utilized by WebKeys may be referred to as a "WebKeys certificate."

Figure 10:
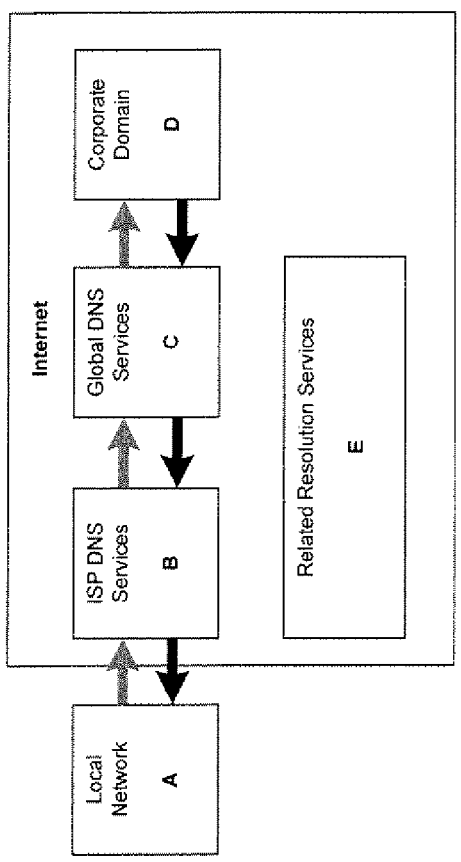
FIG. 10 shows elements of an anti-malware component according to an exemplary embodiment.
Figure 11:
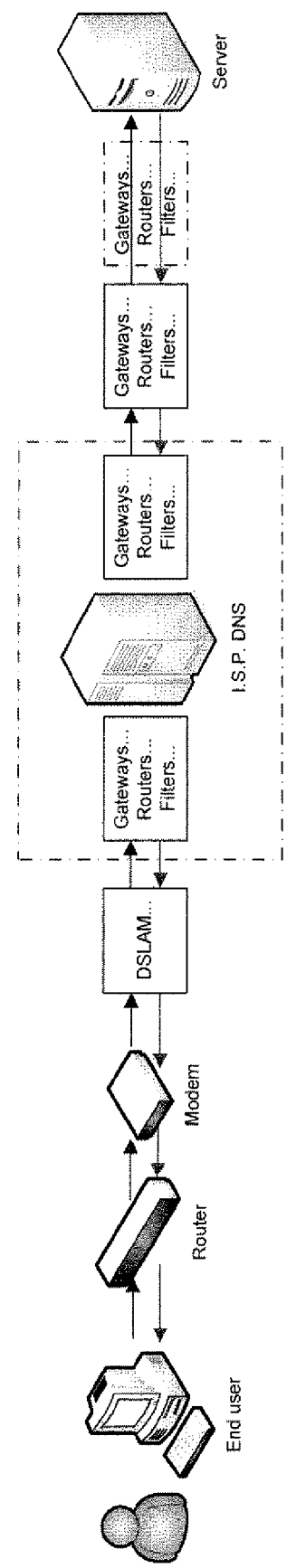
FIG. 11 shows elements of a DNS attack scheme.

Referring to FIG. 10 and Table 1 below, showing various attack vectors on DNS, DNS attack vectors may be classified in a variety of ways:

TABLE 1

| Attack Vector | Target Group | | | | |
| --- | --- | --- | --- | --- | --- |
| | A | B | C | D | E |
| Human Factor | | | | | |
| The insider Edge | ✓ | ✓ | ✓ | ✓ | |
| Local Host and Local Network Attack | | | | | |
| Modification of lookup processes | ✓ | | | | |
| Traffic observation and modification | ✓ | ✓ | | | |
| Man in the Middle Attack | ✓ | | | | |
| Domain Registration Attack | | | | | |
| Domain hijacking | | | | ✓ | |
| Similar domains registration | | | | ✓ | |
| Botnet name server registration | | | | ✓ | |
| Domain configuration Attack | | | | | |
| DNS Wildcards | | | | ✓ | |
| Poorly managed DNS servers | | | ✓ | ✓ | |
| DNS Spoofing | | | | | |
| DNS Cache poisoning | ✓ | ✓ | | | |
| DNS ID spoofing with sniffing | ✓ | | | | |
| DNS ID spoofing without sniffing | ✓ | ✓ | | | |
| Birthday attack | ✓ | ✓ | | | |
| "New" DNS Attacks | | | | | |
| Page rank escalation | | | | | ✓ |

DNS attacks may be conducted at any step of the link, from the local user's computer device to any DNS server, and each of the gateways used. Accordingly, global security may require embedding verification at the user side.

Figure 12:
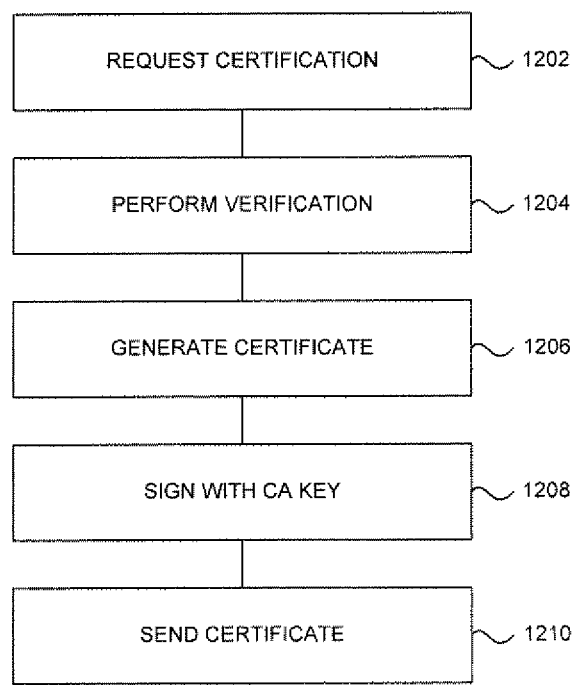
FIG. 12 shows a server-side process of a website authorization component according to an exemplary embodiment.
Figure 13:
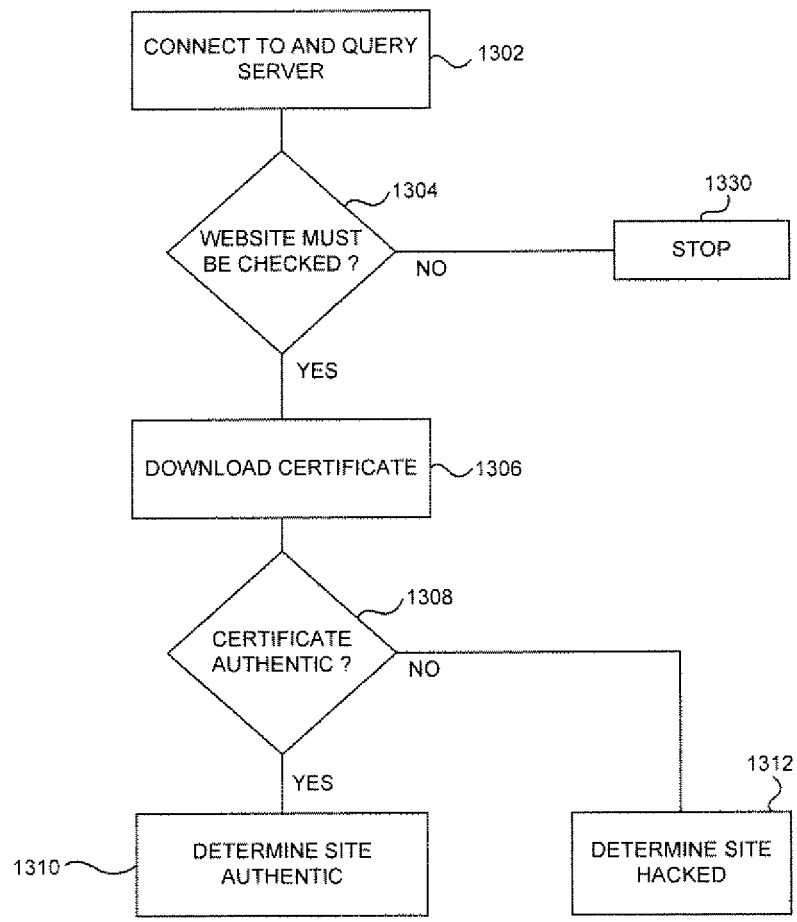
FIG. 13 shows a user-side process of a website authorization component according to an exemplary embodiment.

The website authentication component may detect, mitigate, and prevent, for example, DNS attacks, defacing attacks, pharming attempts, injection attacks, infection attacks, and/or hijacking of remote web sites in a passive manner and without modification of the DNS servers and/or the DNS protocol. Referring to FIGS. 12 and 13, a process of securing DNS systems may include creation of a certificate and usage of the created certificate.

With reference to FIG. 12, creation of a certificate may begin by performing an identified request for certification at an identified public server, at step 1202. The identified public server may be recognized by its fully qualified domain name ("FQDN") and its public TCP/IP address. At a certificate authority, an external verification may be conducted to verify against the registrar and the query originator if the values are correct, verifiable, and coherent at step 1204. Whether the query came from the authorized webmaster may be checked using password information, or any other suitable authentication scheme.

A new certificate may be generated based, for example, on options requested by a webmaster or other person able to maintain and/or administer a server and/or website, including for example expiration date or content protection options of the site at step 1206, then signed using the certificate authority private key at step 1208. In an exemplary embodiment, an entire hierarchy of root certificate authorities is not implemented. The generated certificate may be sent, for example, to a webmaster, at step 1210. This transmission may not require a protected channel, since the certificate cannot be used by other than the original public server.

Referring to FIG. 13, a process for using a generated certificate may begin by a user connecting to a public server and querying the public server, to verify if this server is protected by this kind of certificate, at step 1302. At step 1304, a call to an internal function of the website authentication component may be launched to verify whether the website must be checked.

Depending on a number of sites protected, the list of servers may be implemented locally as a B-Tree database, or updated automatically by the secure communication component auto-update model. For larger lists, three different caching methods may be utilized to allow a better load balancing and management on the server side. In the case of huge lists, a design implementing a dynamic tree bucket cache based on families and hit-ranking queries optimization process may be utilized.

With respect to larger lists, a first level may rely on a form of a URL (a direct or local/restricted IP address for example, or an already known domain) then a top level domain ("TLD") of the domain requested, filtering which countries may be protected or not. A second level, referred to for example as "FastCache" may handle known answers received for a predetermined period of time. A third level may include a bucket of structures describing domain names and their respective protection status, sorted by type and/or characteristics and number of queries received to optimize and arrange answers naturally based on the user's interests. Each query to the secure server may increment a number of hits for this domain name or type, and may categorize them. The requested and one or more other domain names of the same type, category or subject/interest, may be sorted by a number of queries from users. Accordingly, when an user browses the Internet, many successive answers may be found in a previously received Cache before querying the secure server.

When the website is not protected, the process may stop at step 1330. When the website is protected, a background query may download the certificate as the user loads the main site, at step 1306.

Certificates may be made available, for instance on a website, in a variety of ways:
- As an independent file using a static name, for instance using a name such as "web.key" and located directly under the root of the virtual server, relying on a scheme like files "favicon.ico" or in each path of the server;
- Embedded in a cookie, and sent directly with a served page;
- Embedded as an object into an HTML page;
- Embedded as a new dedicated HTML tag. In an exemplary embodiment a specific tag may be implemented, for example, a tag in the form of "<Authenticate type=rsa expires=Jul. 21, 2008 signature=2f3a7c . . . 8d9f3a>," which may be extracted from the document before checking its value;
- Embedded as a registered MIME type, linked to the website authentication component as a handler for this kind of data;
- Embedded as a HTTP header, allowing a low level implantation; and/or
- Embedded as any other form of structural data usable by the network protocol.

Once the website authentication component obtains the certificate, the website authentication component may use the certifying authority's public key to verify the certificate authenticity, at step 1308. The verification may also rely on a keyed-hash message authentication Code ("HMAC" or "KHRMAC") scheme, without any public key to verify the certificate authenticity.

When the verification of step 1308 is positive, one or more certificate fields may be extracted and matched against data received on the client side to detect differences between the received data and corresponding signatures of the authenticated certificate. In an exemplary embodiment, at least one of a digital signature or a hash code of the data received on the client side may be calculated, and the calculated digital signature or hash code may be compared with corresponding values embedded in the certificate; any difference between the calculated and embedded values may be detected.

Values verified may include an IP address used to connect to the server, which may be extracted from the TCP/IP stack, and the FQDN of the connected server, which may also be extracted from the TCP/IP stack. Any other suitable values received on the client side may be analyzed to verify that the received data matches corresponding values of the certificate.

When all the values are verified as authentic, mandatory fields match the corresponding values, and any optional fields are verified, the site may be determined to be verified and authenticated, at step 1310.

When the certificate is not determined to be authentic, and/or when any extracted field does not match a corresponding value defined in the certificate, a problem or attack alert is raised, and the website may be determined to be invalid, modified, and/or hacked, at step 1312. Additional analysis may be performed to define which factor and/or factors are at fault, and results of the additional analysis may be transmitted to the survey server. Additionally, an alert may be generated and/or transmitted to the user, an administrator of the computer device of the user, or other suitable entity. Further, when the analysis indicates a mismatch of the IP addresses, it may be redirected to the certificate's defined IP address, thus deactivating the direct DNS attack.

Figure 14:
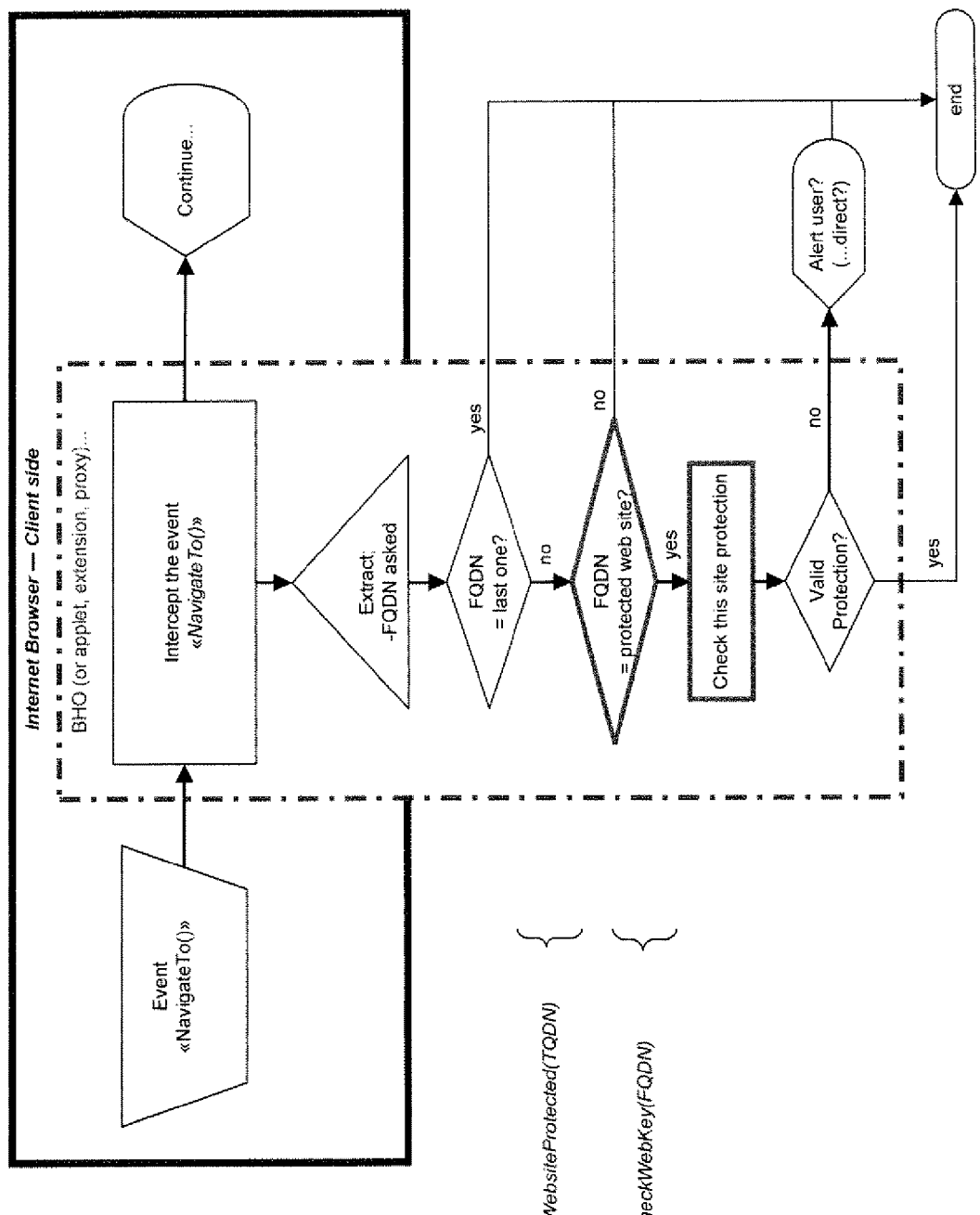
FIG. 14 shows elements of a browser integration of a website authorization component according to an exemplary embodiment.
Figure 15:
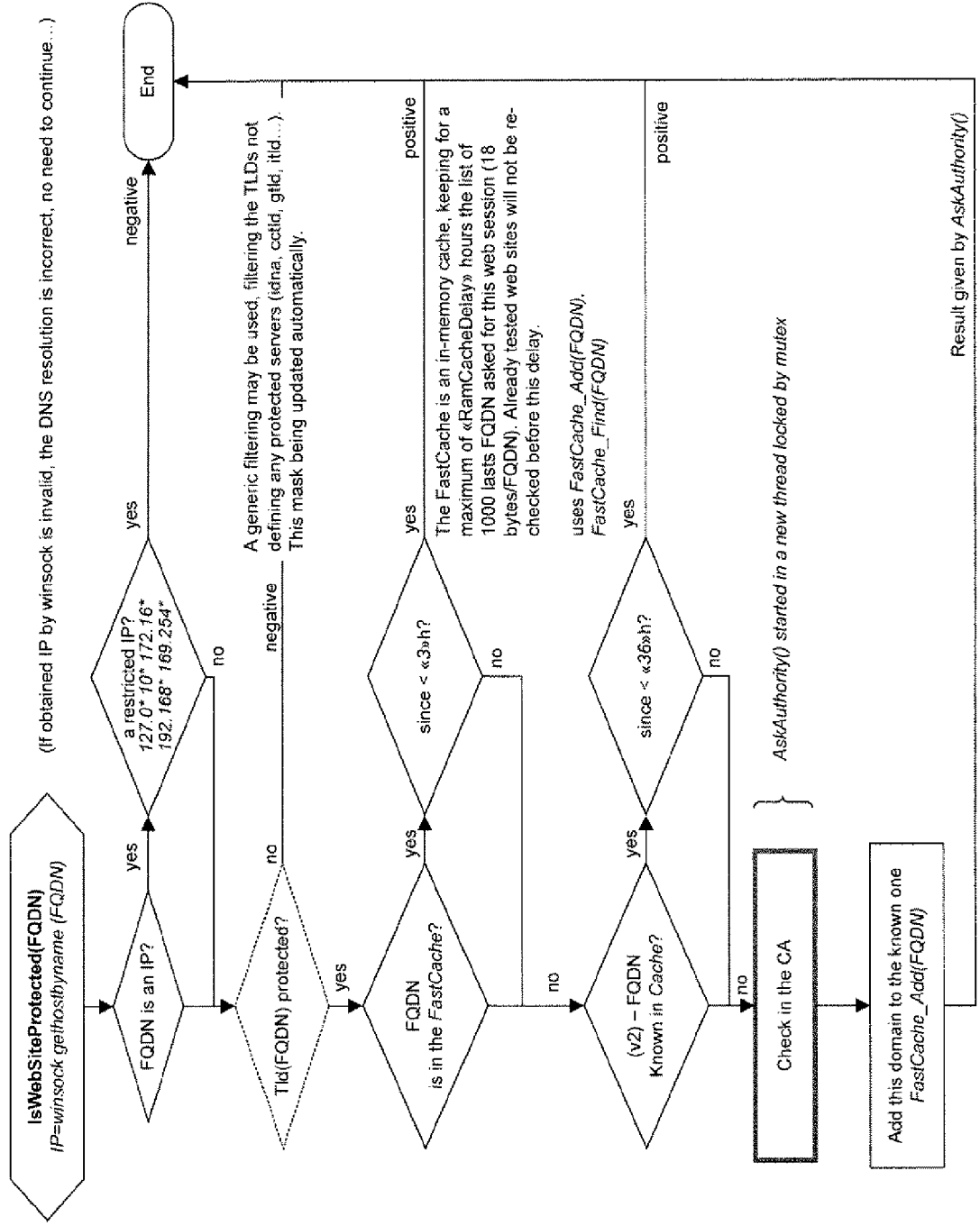
FIG. 15 shows a process for determination of protection of a website by a website authorization component according to an exemplary embodiment.

Elements of a browser integration of a website authentication component are shown, for example, in FIG. 14, and FIG. 15 shows an exemplary process for determination of protection of a website by the website authentication component.

Exemplary structures of a certificate are described with reference to Table 2, below, showing field classes of a certificate.

TABLE 2

| Nature | Fields | Remarks |
|---|---|---|
| Mandatory | IP Address | Public IP Address of the server, as dotted string, or numerical value. |
| | Domain Name | Fully Qualified Domain Name, dotted or not. |
| | Signature | Digital signature of all fields exposed in this certificate, which may use the Editor's Private Key. |
| Optional | Expiration Date | Optional expiration date of the certificate. |
| | Static Content | Hash value (md5( ), sha1( ), ...) of the normalized (or not) content of the exposed content (home page). |
| | Dynamic Domains | Hash value (md5( ), sha1( ), ...) of the normalized (or not) sorted list of unique domain names used for any dependencies. |
| | Code Content | Hash value (md5( ), sha1( ), ...) of the normalized (or not) script code visible on the default resource. |
| | Resources Content | Hash value (md5( ), sha1( ), ...) of the normalized (or not) sorted list of unique resources content used on this page, globally or nature by nature. |

In an exemplary embodiment, the certificate may define at least three values: a public IP address of the protected website, which may be matched with the value used by the TCP/IP stack on the user's computer device; a FQDN of the protected web site, which may be matched with the value used by the application, web browser software application, and/or TCP/IP stack used to connect to the server; and a digital signature of the certificate, which may use the public key embedded in the code and/or updated from a secure server but not stored within the certificate. A standard message authentication code ("MAC") scheme may be used, such as HMAC or other suitable ciphering scheme.

Additionally, the certificate may define optional values, including but not limited to:

Expiration date: the expiration date may allow handling of key expirations, revocations, and brute-force attacks. The expiration date may define a validity limitation to any certificate.

Static content: the static content may be used when, for instance, the protected web page is a static web page. For example, the certificate may store a hash code of the content of the web page. Accordingly, a client-side process may check whether a downloaded web page matches the original valid web page as signed by a webmaster of the original web page. When the check indicates a difference, a defacing attack may be indicated, as well as injections, forging, pharming, or another content based attack. Process, IP frames and memory injection-based attacks may be detected, as the check is performed on the client-side. The hash value may be calculated by obtaining the document content of the server, for instance the HTML content, eventually normalizing the obtained content, and calculating a hash value of the normalized content using a standard hash function such as md5, sha1, shaS12, ripemd, or any other suitable function.

Dynamic domains: dynamic domain information may be used, for example, when the content is dynamically generated. In an exemplary embodiment, all domains referenced by used resources may be listed for a main document to be protected and/or for an entire web site. All HTML tags defining a dependency pattern may be listed, the domain names listed may be extracted, the list may be sorted, and duplicate items may be eliminated to obtain a list of all unique sub-domains referenced by the document, or the whole site. Exemplary HTML tags defining a dependency pattern are shown, in Table 3 below. A hash value for this list may be generated to allow locking of the list of sub-domains, disallowing insertion of any new external reference without detection.

Code content: the code content may relate to, for example, scripts or other code embedded in web pages. All scripting modules may be extracted from HTML5 tags. Utilizing a normalization process, benign variations may be filtered out, the content may be hashed, and a script verification hash code may be generated. Accordingly, the client-side code may check whether the active code stored on a server has been modified, injected, or otherwise manipulated.

Resources content: the resources content may relate to, for example, external resources used by the document and/or an entire web site. For instance, images, objects, java, flash animations, sounds, and other multimedia files may be used to embed malware vectors or fraudulent elements. Each of these dependencies may be listed and/or linked by families or type, allowing generation of a fingerprint of their original form and/or content; accordingly their legitimate factor from the side of the end-user may be verified. A list of definitions may link each and/or a selection by nature or family of resource names with a fingerprint in the body of the certificate. The list may be used on a client-side by calculating the fingerprint of the downloaded resource against the value of the certificate, and differences may indicate an injection, spoofing, tampering, or hacking of the studied resource.

Table 3, below, shows various HTML tags which may be used to detect and protect references and dependencies.

TABLE 3

| HTML Attributes | Container HTML Tag | Detection Field |
|---|---|---|
| src = | <img, <embed, <script, <frame, <bgsound, <frame, <iframe, <input, <meta | Domains, Code, Resources. |
| href = | <a, <area, <base, <map, <link | Domains, Resources |
| url = | <meta, <embed | Domains, Resources |
| pluginspage = | <object | Domains, Code, Resources. |
| Value = | <object | Domains, Code, Resources, |
| codebase = | <object, <applet | Domains, Code, Resources. |
| Code = | <applet | Domains, Code, Resources. |
| background = | <body | Domains, Resources |
| archive = | <applet | Domains, Code, Resources. |
| cite = | <blockquote | Domains, Resources |
| action = | <form | Domains, Resources |
| longdesc = | <img, <frame | Domains, Resources |
| profile = | <head | Domains, Resources |
| xmlns | <html | Domains, Resources |
| ismap = | <img | Domains, Resources |
| usemap = | <img, <object | Domains, Code, Resources. |
| archive = | <object | Domains, Code, Resources. |
| Data = | <object | Domains, Code, Resources. |
| Value = | <object | Domains, Code, Resources. |

Additionally, and using a scheme similar to a scheme of RFC 4871 ("DKIM"), the public key of any web site may be published in a "TXT" field on its own DNS server, and may be widely available and revocable. The whole certificate may be implementing into a dedicated HTML tag, cookie, or page.

Figure 16:
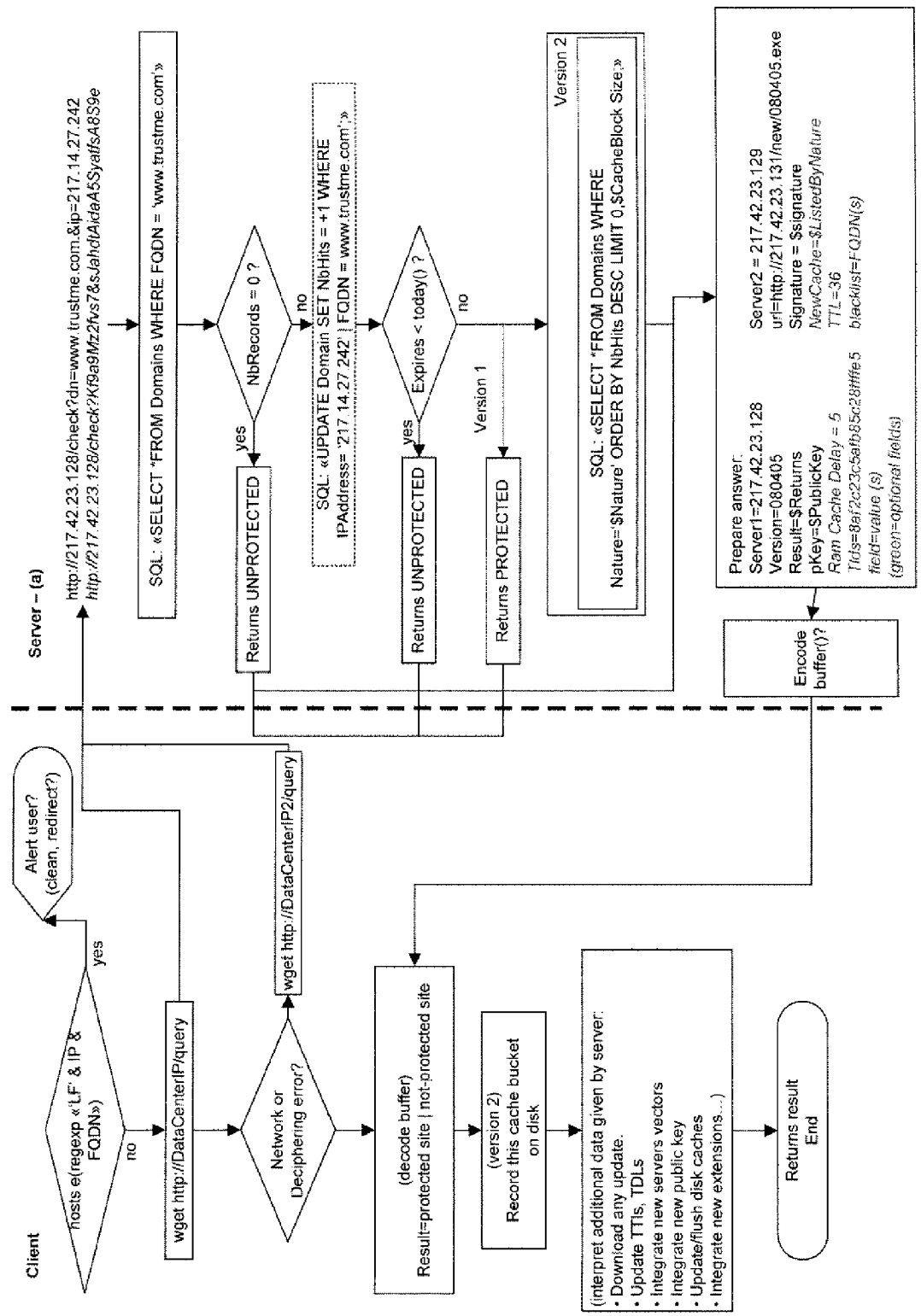
FIG. 16 shows a process for checking protection of a server by a website authorization component according to an exemplary embodiment.

FIG. 16 shows an exemplary process for checking protection of a server by the website authentication component.

Figure 17:
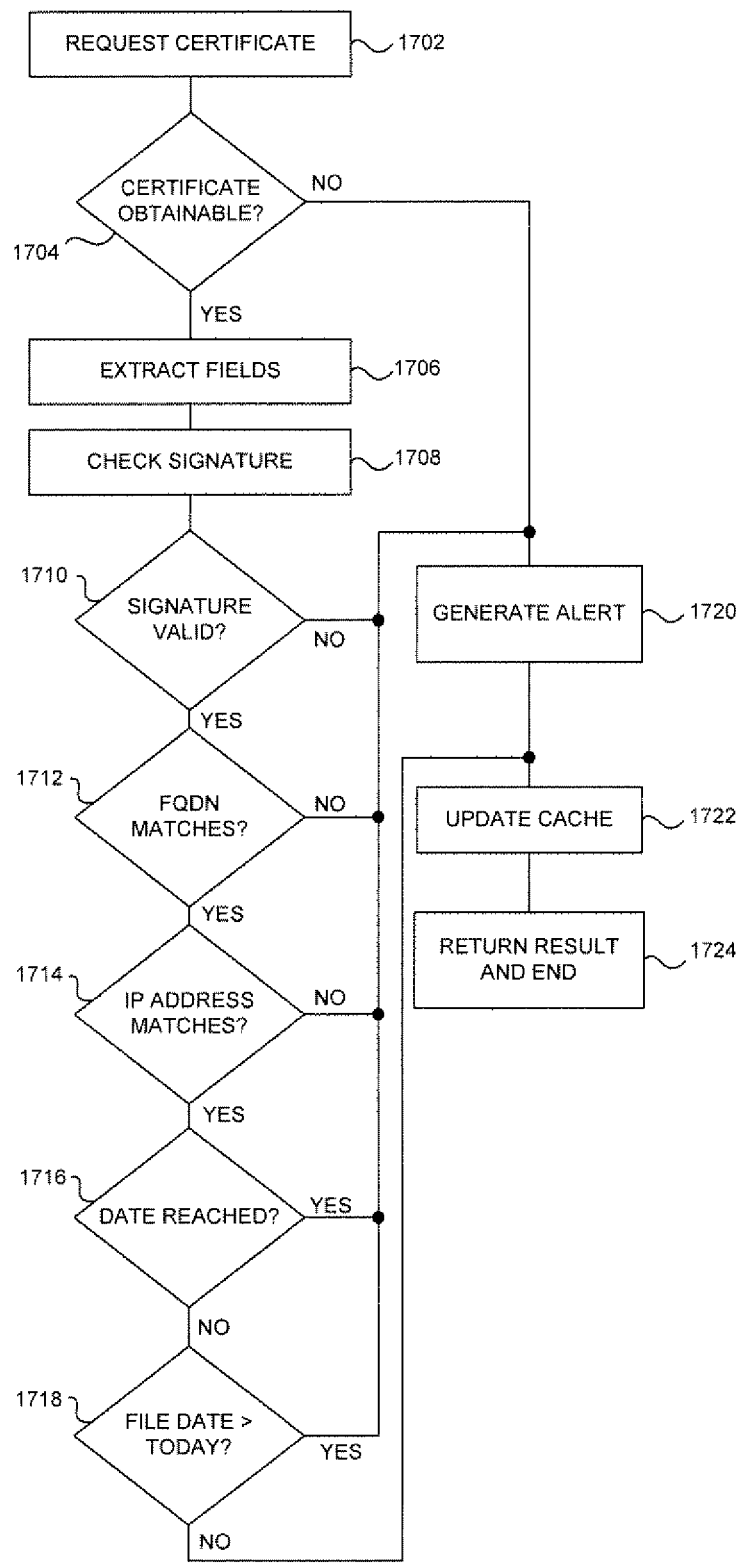
FIG. 17 shows a process for checking a certificate by a website authorization component according to an exemplary embodiment.

FIG. 17 shows an exemplary process for checking a certificate by the website authentication component. Referring to FIG. 17, a request to load the certificate may be performed at step 1702, and whether the certificate may be obtained and/or downloaded is determined at step 1704. When the certificate may not be obtained, an alert may be generated and transmitted to the user, to an administrator of a network of the user, or to another entity, at step 1720, the cache may be updated at step 1722, and the process may return a result and end at step 1724. When the certificate is obtainable, the fields may be extracted from the obtained certificate, at step 1706, and a digital signature of the certificate may be checked at step 1708 and determined to be valid or invalid at step 1710. When the signature is invalid the process may proceed to step 1720. When the signature is determined to be valid, whether the FQDN of the certificate matches the requested FQDN may be determined at step 1712. When the FQDN does not match, the process may proceed to step 1720. When the FQDN does match, whether the IP address of the connection matches the certificate's IP address may be determined at step 1714. When the IP address does not match, the process may proceed to step 1720. When the IP address does match, whether an expiration date has been reached may be determined at step 1716. When the expiration date has been reached, the process may proceed to step 1720. When the expiration date has not been reached, attempts to spoof a current date and/or time by setting a local computer device clock to a date and/or time occurring in the future with respect to a present date and/or time are determined at step 1718. When the date and/or time of one or more systems and/or locked local files such as registry files, system startup files, log files, cache files, and the like, are located in the future a modification of a system clock may be indicated. When the system date is a future date, the process may proceed to step 1720. When the system date is not greater than a present date, the cache may be updated at step 1722, and the process may return a result and end at step 1724.

Generic Certification Interface Component

A generic certification interface ("GCI") model may be utilized to implement an electronic mail certification interface. The GCI component may utilize existing electronic mail certification standards, for instance, standards described by "DKIM" or "DomainKeys." The GCI API may provide detection of a DKIM status of an electronic mail and/or other electronic communication for electronic mail reading software applications, or for any extension.

Additionally, implementation of such a certification model may provide other functions. For instance, the GCI model may provide a dedicated server structure as a public key "open" repository when the network used by a user does not provide public keys via the DNS server, as in the mechanism of DKIM. The GCI component may be implemented as a standard POP/SMTP/IMAP proxy to intercept standard electronic mail client software communication.

A method for allowing a network to create its own set of DKIM keys may utilize a HardwareUID and UserUID of the GCI component, to limit abuse and to provide tracking of key revocations. Accordingly, entities may benefit from a certification process and utilize a peer-to-peer architecture before the keys may be linked to their respective DNS servers.

At an initial launch of the GCI component, existence of a public-private key pair may be checked, and a key pair may be generated when a key pair is determined to not be defined. Once generated and/or defined, the private key may be kept secure on a local computer device, while the public key may be sent to the public keys server. The public key may be linked to the ComputerUID and UserUID. as well as to information associated with the network.

The public keys server may register the public key to allow a further query to verify an existence and value of the public key.

An electronic mail and/or other electronic communication sent from a local computer using the GCI component may be signed using the ComputerUID and/or UserUID as a DKIM selector. A "DomainKey-Signature:" field of the electronic mail may describe a version and an alternative key server infrastructure. Description of a version and alternative key server may be used, for example, to avoid mismatching between the DNS public keys model and the GCI private server model for handling the public keys.

Upon receipt of an electronic mail or other electronic communication, the GCI component may analyze the "DomainKey-Signature:" field of the electronic mail. When the "DomainKey-Signature:" field does not exist, the electronic mail may be certified. When the "DomainKey-Signature:" field does exist and defines a standard DKIM version, the standard model using DNS servers for querying public keys may be used. When the "DomainKey-Signature:" field defines a GCI version, the alternative key server infrastructure for the public keys repository may be used.

In an exemplary embodiment, the GCI component may be implemented as a proxy on local computer devices. When the GCI component is implemented as a proxy on local computer devices, the GCI component may silently check incoming electronic mail and/or other electronic communications, while certifying all outgoing electronic mail and/or other communications.

Once installed, the GCI component may offer generic DKIM functionality transparently and automatically, and may evolve to a standard DKIM if DNS servers implement a standard interface to implement public keys management. Alternatively, the GCI component may remain defined as an alternative key server infrastructure.

The GCI component may provide for a generic normalization model allowing signing of electronic mail contents modified while sent using free email services, open gateways, and anti-virus and other systems which modify content of the electronic mail or add data to the electronic mail. For instance, electronic mail gateways, advertisement insertions, and/or anti-virus notifications added to an electronic mail may add extra data to the electronic mail, modify electronic mail line width, and the like.

The GCI component may utilize an alternative calculation algorithm to calculate a signature of the content body of the electronic mail, for instance, to prevent discarding of a signature or voiding due to content modification performed by applications such as anti-virus software, free email servers, and/or gateways.

The text data of the electronic mail may be extracted, and HTML code may be filtered, and spacing, special characters, and control characters, such as carriage return, line feed, tabulations, special characters, and the like may be replaced by a space characters, Redundant occurrences of the space character may be replaced by a single space character. A length of the buffer may be calculated, for example, in bytes, and other characters may be normalized using a predetermined mechanism, for instance, using the "RFC 3986" syntax describing URL encoding.

The normalization may void any format modification due to gateways reformatting lines lengths, while storing the length of the handled buffer allows checking always the same part of the text buffer, before any addition. The resulting data may be compressed using a Huffman tree function, or any other suitable function, generating a higher entropy buffer for the hashing pass. The compressing may be used instead of the normalization, voiding any character re-encoding. A hash code of the buffer may be calculated using a standard hashing function, for instance, "Sha1" as the content hash code of the data. The buffer length value may be stored, for instance, in an optional field of the signature description.

The GCI component may permit signing and adding certification to a file, office document, source and configuration files, and the like, using the same public key repository architecture.

A generic API may offer several functions. In an exemplary embodiment, for example, the functions may include signing a document and verifying a document.

In a document signing function, a buffer of data may be obtained. The buffer may be obtained, for example, by extracting the content of an active window by copying, pointing to a buffer of data, containing a file content, and the like. The private key may be used to sign a specific buffer containing a set of data. This set of data may define a structure describing, for instance, the "ComputerUID" of the signing computer, the "UserUID" of the signing user, a date and time, a hash code of the content of the data buffer, for instance normalized and/or compressed, and a unique identifier of the document, including a special value ("DocUID") generated to recognize identical documents between, or as successive, versions. The document signing function may then serialize this structure as a series of numerical values in a numerical base to perform compression, before re-encoding-it into a string of characters. The string may then be inserted at an end of the document, may be delimited by a set of special markers, and replacing any occurrence of a precedent matching of those. In an exemplary embodiment, the special characters may include characters such as "{" and/or "}".

The document verifying function may obtain a buffer of data in accordance with a procedure similar to that described above, and may search for occurrences of the special markers. When the one or more of the special characters are found, the string enclosed between the markers may be extracted, decoded, and de-serialized to obtain the structure of the data. This structure may be analyzed to allow identification and/or tracking of an entity and/or individual that created the document, on which computer device, a date of creation, a time of creation, and modifications performed to the document, if any exist.

Embedding a signature into a main body of the document may allow defining implicitly an "ends" of the document at a time of the signing process, and a limit of the document to check for the verification process, to avoid addition of any further data by gateways, other software, and signatures/advertisements. This scheme may be used as a main signature format system for the "DKIM" signing scheme, avoiding needing to store the length of the document to check.

A public server may register any newly-created signature generated by the document signing function, allowing a double-certification by voiding a forging attempt. While checking a document, an extracted document signature may allow querying this server and verifying if the signature was registered, for instance, by using an independent time base than that used by a first computer device.

Additionally, tracking of the evolution of a document through multiple versions may be performed by maintaining a DocUID unique identifier for the document between multiple and successive signatures.

The API may be configured and/or designed as an ActiveX server, and may be embedded into major office and other software applications as well as specific applications, for example, software applications such as "Microsoft office," "Microsoft Windows," and "Internet Explorer."

The GCI component may extend the DomainKeys system by allowing users to implement this protection. The default standard defines the DNS server as the main public key repository, which may not be directly usable by the user. Additionally, securely creating and managing a set of private and public keys are difficult tasks for a conventional user to perform.

Conventional operating systems, for instance operating systems such as Microsoft Windows, implement machine and user sets of keys, which may be protected and available through a dedicated interface such as a "CAPICOM" object or a ".Net" cryptographic layer. The GCI component may rely on these cryptographic interfaces to use any existing sets of keys for a user, or to define new keys, while allowing storage and management tasks to these protected interfaces and components of the operating system. The GCI component may operate as an independent interface between an isolated user or small network and an existing DKIM infrastructure.

Accordingly, files, office documents, emails and any kind of digital data may be signed. Data signing according to an exemplary embodiment may include, for example, embedding a digital signature as an element of signed text determining an end of signed data. The signed data may be normalized to avoid broken signatures due to modified formats and adding of data. Standard signature schemes including DKIM, Domain-Key, and any suitable other scheme having public key repositories for defining a generic documents authentication system without a user-side infrastructure may be linked. Digital signatures may be linked with the signing computer device and a user anonymous identifier, and/or digital signatures may be linked with a document unique identifier allowing tracking of multiples versions of a document. Digital signatures may be linked with a document's date of signature to allow tracking revisions of a document. A public document signatures repository may allow a double check of any signature without local date and/or time considerations as well as a global anonymous tracking system for documents.

The embodiments described above are illustrative examples of the present application and it should not be construed that the present application is limited to these particular embodiments. Various changes and modifications may be effected by one skilled in the art without departing from the spirit or scope of the application as defined in the appended claims. For example, elements and/or features of different illustrative embodiments may be combined with each other and/or substituted for each other within the scope of the present disclosure and the appended claims. In addition, improvements and modifications which become apparent to persons of ordinary skill in the art after reading the present disclosure, the drawings, and the appended claims are deemed within the spirit and scope of the present application.

The invention claimed is:

1. A computer-implemented method of correction of domain name server (DNS) errors and hacking attempts, the method comprising:
   receiving by a client computer a digital certificate from a server, wherein the digital certificate comprises a fully qualified domain name of the server and an associated first TCP/IP address of the server;
   receiving by the client computer a second TCP/IP address of the fully qualified domain name of the server from a DNS;
   comparing by the client computer the first TCP/IP address from the digital certificate with the second TCP/IP address received from the DNS;
   detecting a problem in the DNS by the client computer when a difference between the first TCP/IP address and the second TCP/IP address is detected; and
   identifying by the client computer a correct connection to the server when no difference between the first TCP/IP address and the second TCP/IP address is detected.

2. The computer-implemented method of claim 1, further comprising:
   routing client communication to the server using the first TCP/IP address upon the detection of the problem in the DNS.

3. The computer-implemented method of claim 1, further comprising:
   executing a query to a second fully qualified domain name by the client computer, wherein the digital certificate further comprises a plurality of fully qualified domain names referenced by the server,
   comparing the second fully qualified domain name to the plurality of fully qualified domain names referenced by the server; and
   detecting an injection of fraudulent content when the second fully qualified name is not one of the plurality of fully qualified domain names referenced by the server.

4. The computer-implemented method of claim 1, further comprising:
   creating the digital certificate by the server computer; and
   transmitting by the server the digital certificate to the client computer.

5. The computer-implemented method of claim 1, wherein the server computer is a web-server and the first TCP/IP address of the server is inserted into the digital certificate by a webmaster.

6. A computer-implemented method for detecting domain injection or evasion, the method comprising:
   receiving by a client computer a digital certificate from a server, the digital certificate comprising at least one of: a list of fully qualified domain names referenced by the server, an associated TCP/IP addresses for the list of fully qualified domain names referenced by the server, code content, or unique resources;
   browsing the web page by the client computer and retrieving query data comprising unique domain names referenced by the server, code used by a web-page, or unique resources referenced by the web-page; and
   detecting an injected domain name by the client computer throughout a session with a web-site by comparing a plurality of automatically queried domain names by a browser of the client computer with a plurality of fully qualified domain names from the fully qualified domain names contained in the digital certificate, queried TCP/IP addresses with at least one of the associated TCP/IP addresses contained in the digital certificate, the code used by the web-page with the code content contained in the digital certificate, or the unique resources referenced by the web-page with the unique resources contained in the digital certificate.

7. The computer-implemented method of claim 6, wherein the digital certificate is exposed to software on the client or a client web browser.

8. The computer-implemented method of claim 6, further comprising:
   preventing execution of a query to the injected domain name by preventing the query to the injected domain name from reaching a network layer of the client or answering the query to the injected domain name using local content.

9. The computer-implemented method of claim 3, further comprising:
   preventing receipt of fraudulent content by the client computer by at least one of: preventing the query from reaching a network layer of the client or answering the query using local content.

* * * * *